United States Patent
Taylor et al.

(10) Patent No.: US 9,385,560 B2
(45) Date of Patent: Jul. 5, 2016

(54) METHODS, DEVICES AND SYSTEMS FOR SELF CHARGING SENSORS

(71) Applicant: QUALCOMM Incorporated, San Diego, CA (US)

(72) Inventors: Kirk Steven Taylor, San Diego, CA (US); Kenneth Kaskoun, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 14/077,665

(22) Filed: Nov. 12, 2013

(65) Prior Publication Data

US 2015/0128733 A1    May 14, 2015

(51) Int. Cl.

| H02J 7/32 | (2006.01) |
|---|---|
| H02J 7/00 | (2006.01) |
| H02J 7/02 | (2016.01) |
| H02J 17/00 | (2006.01) |
| G01D 11/00 | (2006.01) |

(52) U.S. Cl.
CPC ............... *H02J 7/025* (2013.01); *G01D 11/00* (2013.01); *H02J 17/00* (2013.01)

(58) Field of Classification Search
CPC .................................. H02J 7/025; H02J 17/00
See application file for complete search history.

(56) References Cited

U.S. PATENT DOCUMENTS

| 6,304,176 B1 | 10/2001 | Discenzo |
| 2005/0017602 A1 | 1/2005 | Arms et al. |
| 2010/0049377 A1 | 2/2010 | Scheid et al. |
| 2011/0148349 A1 | 6/2011 | Kim et al. |
| 2012/0313649 A1 | 12/2012 | Park et al. |
| 2013/0002045 A1 | 1/2013 | Hassan-Ali et al. |
| 2013/0137946 A1 | 5/2013 | Geske et al. |

FOREIGN PATENT DOCUMENTS

| EP | 1614551 A2 | 1/2006 |
| WO | 2010093969 A2 | 8/2010 |

OTHER PUBLICATIONS

International Search Report and Written Opinion—PCT/US2014/065056—ISA/EPO—Mar. 3, 2015.
Sardini E., et al., "Passive and Self-Powered Autonomous Sensors for Remote Measurements," Sensors 2009, vol. 9, pp. 943-960.

*Primary Examiner* — Peter Macchiarolo
*Assistant Examiner* — Anthony W Megna Fuentes
(74) *Attorney, Agent, or Firm* — The Marbury Law Group, PLLC

(57) ABSTRACT

Methods, systems and devices for an energy harvesting sensor are disclosed. A sensor device may include an energy harvesting element configured to harvest energy from a source of energy that is to be measured by the sensor device, and an energy storage element configured to store energy generated by the energy harvesting element. The sensor device may further include a transmitter circuit coupled to the energy storage element and configured to transmit a wireless signal when the energy stored in the energy storage element is sufficient to power a transmission of the wireless signal. The time between transmissions by the transmitter may be used by a receiver of those transmissions to calculate a measure of the quantity being used for energy harvesting.

16 Claims, 12 Drawing Sheets

METHODS, DEVICES AND SYSTEMS FOR SELF CHARGING SENSORS

BACKGROUND

The invention is generally related to a self-charging (e.g., energy harvesting) sensor that wirelessly transmits signals corresponding to measured quantities. More specifically, the invention is related to a sensor that harvests energy from the same quantity (e.g., activity, temperature, flow, moisture, etc.) that is being measured by the sensor such that a change in the rate of charge of the energy harvesting results in a change in the frequency of reporting thereby providing measurement information regarding the measured quantity.

Conventional energy harvesting mechanisms are well known. One example of energy harvesting may include perpetual watch movements that generate and store mechanical energy based on movement of the wearer. An off center weight or cam may rotate on a spindle based on movement in the arm or hand of the wearer. The rotation of the cam may be translated into stored energy by passing a magnet by a coil that is coupled through a diode to capacitor. Another example is thermal energy harvesting that uses thermoelectric materials to generate an electrical potential from the heat flux passing through the thermocouple elements, with the electrical potential used to charge a capacitor. Another example of energy harvesting is a flow meter that may be equipped with permanent magnets on a rotating plate. As the magnets rotate with the plate during flow of the measured liquid, a current may be induced into stators generating energy with which the meter may be powered.

Wireless sensors are also known, but may require relatively complex sensing and transmission modules along with batteries or power sources that correspondingly require a large sensor footprint. The complex circuitry may further lead to rapid battery power consumption. For applications that require smaller form factor sensors, such as medical applications, energy harvesting becomes a greater challenge as the need for power that may be necessary to drive the sensor and provide information about the measured quantity may exceed the relatively small amount of energy generated by the energy harvesting mechanism. Also, to be practical as a disposable medical sensor, sensor elements must be simple and inexpensive to manufacture.

SUMMARY

Various embodiments include a self-charging energy harvesting sensor configured to harvest energy from the phenomenon that is being measured and transmit a wireless signal when sufficient energy has been harvested such that the rate at which signals are transmitted can be correlated to the energy level of the phenomenon being measured. The self-charging energy harvesting sensor may include an energy harvester circuit that can harvest energy from an energy source or phenomenon, such as temperature, movement, chemical reactions (e.g., chemical reactions with sweat or other bodily fluids), fluid flow, etc. The energy harvesting circuit may be configured to charge an energy storage element, such as a capacitor, battery, or other energy storing circuit. The energy storage element may be coupled to a radio circuit (referred to herein as a quote transmitter") configured to emit a wireless signal with a recognizable characteristic. When a signal has been transmitted, an optional discharge circuit may discharge the energy storage element back to a reference level. The energy storage element may continue to be charged and discharged during operation of the sensor. As the energy harvesting quantity changes, the rate of charge of the energy storage element also changes, which affects the rate at which signals are transmitted by the transmitter. Such a self-charging energy harvesting sensor is advantageous because the circuitry can be very simple, and thus the device can be made very small and inexpensive. Baseline values for signal transmission rates compared to the measured quantity may be determined by design or testing. A receiver system may then use the baseline signal transmission rate values to determine a measure of the phenomenon used to harvest energy based on the observed rate of transmitted wireless signals.

In an embodiment, a sensor device may include an energy harvesting element configured to harvest energy from a source of energy that is to be measured by the sensor device, an energy storage element configured to store energy generated by the energy harvesting element, and a transmitter circuit coupled to the energy storage element and configured to transmit a wireless signal when the energy stored in the energy storage element is sufficient to power transmission of the wireless signal. In an embodiment, the transmitter circuit may include a transmitter, an antenna coupled to the transmitter, and a transmission threshold circuit configured to connect the transmitter to the energy storage element when the energy stored in the energy storage element satisfies a transmission threshold. In an embodiment, the sensor device may further include a discharge circuit coupled to the energy storage element that is configured to discharge the energy storage element after a wireless signal is transmitted by the transmitter. In an embodiment, the discharge circuit may include a resistor and a discharge threshold circuit configured to connect the resistor to the energy storage element when the energy stored in the energy storage element after a wireless signal is transmitted by the transmitter exceeds a discharge threshold.

In an embodiment, the transmission threshold circuit and the discharge threshold circuit may include a controller configured with processor executable instructions to perform operations including determining when the energy stored in the energy storage element satisfies the transmission threshold and the discharge threshold, connecting the transmitter to the energy storage element in response to determining that the energy stored in the energy storage element satisfies the transmission threshold, and connecting the resistor to the energy storage element after connecting the transmitter to the energy storage element in response to determining that the energy stored in the energy storage element exceeds the discharge threshold.

In an embodiment, the sensor device may include a plurality of sensors coupled to the controller and configured to measure different quantities. In this embodiment, the controller may be configured with processor executable instructions to perform operations including determining when the energy stored in the energy storage element after the transmitter circuit transmits a wireless signal satisfies an intermediate threshold sufficient to enable transmission of sensor data by the transmitter, and causing the transmitter to transmit sensor data from at least one of the plurality of sensors in response to determining that the energy stored in the energy storage element satisfies the intermediate threshold.

A further embodiment method of measuring a quantity may include harvesting energy from a source of energy to be measured using an energy harvesting circuit in a sensor device, storing the harvested energy in an energy storage circuit of the sensor device, and transmitting a wireless signal by a transmitter of the sensor device using energy stored in the energy storage circuit when the stored energy is sufficient to power the transmitter to transmit the wireless signal such that a measure of the quantity may be based on an interval between transmissions by the transmitter. An embodiment method may further include discharging the energy storage element after a wireless signal is transmitted by the transmitter. An embodiment method may further include receiving wireless signals from the transmitter in a receiving device, determining intervals between receptions of wireless signals from the transmitter, and calculating measures of the quantity based on the determined intervals between receptions of wireless signals from the transmitter. An embodiment method may further include determining whether the quantity is changing based on whether the determined intervals between receptions of wireless signals from the transmitter are changing. An embodiment method may further include storing, as sensor data, at least one of: the determined intervals between receptions of wireless signals; and/or the calculated measures of the quantity, connecting to a server, and transferring the stored sensor data to the server.

In an embodiment, a system for measuring a quantity may include a sensor device as described above, and a receiving device including a receiver circuit configured to receive wireless signals transmitted by the sensor device and a processor configured with processor executable instructions to perform operations including determining intervals between receptions of wireless signals received from the sensor device, and calculating measures of the quantity based on the determined intervals between receptions of wireless signals from the sensor device. In an embodiment, the receiver processor may be configured with processor executable instructions to perform operations further including determining whether the quantity is changing based on whether the determined intervals between receptions of wireless signals from the transmitter are changing, storing as sensor data at least one of the determined intervals between receptions of wireless signals and the calculated measures of the quantity, and/or transferring the stored sensor data to a server.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1A:
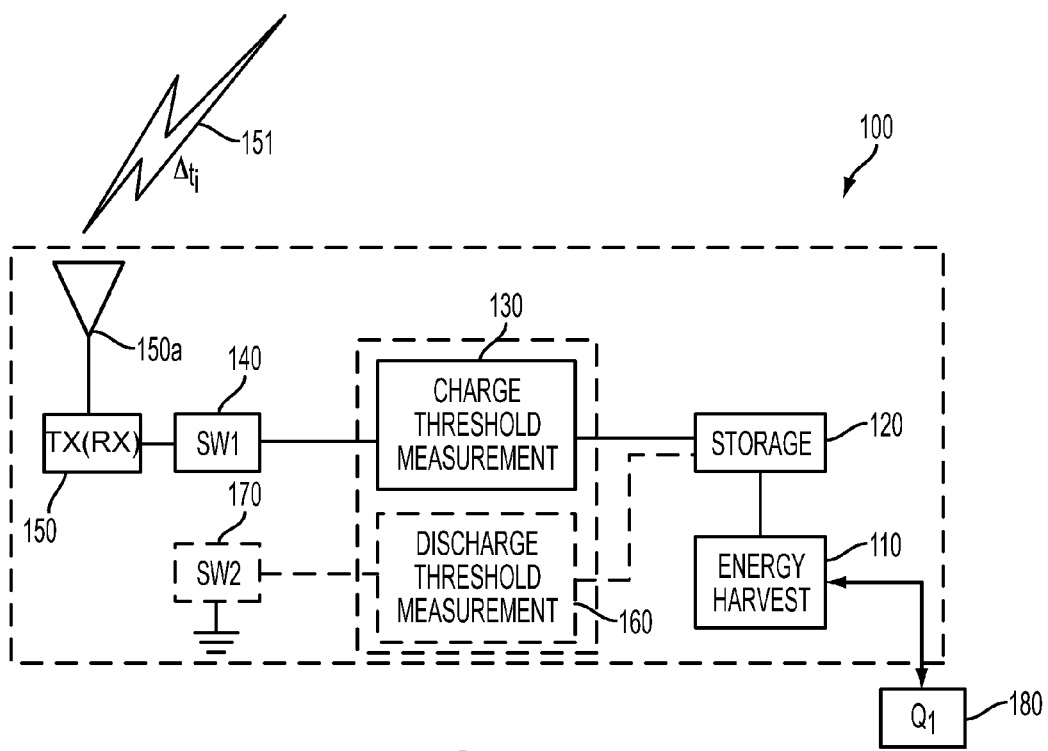
FIG. 1A is a block diagram illustrating an embodiment sensor circuit including an energy harvester, a charge storage device, charge and discharge threshold devices and a transmitter.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used herein to any one or all of cellular telephones, smartphones, personal or mobile multi-media players, personal data assistants (PDAs), laptop computers, desktop computers, tablet computers, smart books, palm-top computers, wireless electronic mail receivers, multimedia Internet enabled cellular telephones, televisions, smart TVs, smart TV set-top buddy boxes, integrated smart TVs, streaming media players, smart cable boxes, set-top boxes, digital video recorders (DVR), digital media players, and similar personal electronic devices which include a programmable processor, especially those that include an SoC.

The various embodiments include self-charging energy harvesting sensors configured to wirelessly transmit a report (e.g., a signal, beacon, or other wireless communication) when sufficient power has been generated/harvested to enable the transmission in a manner that enables the periodicity of the transmissions to be correlated to a measurement of the source of the harvested energy. By harvesting energy from the quantity being measured and reflecting that quantity in the periodicity or rate at which wireless signals are emitted, a low-cost, simple sensor can be provided.

As used herein, the term "sensor" refers to an embodiment device that converts one or more detectable physical phenomena into and electrical signal that is used to power a wireless transmitter at a rate that correlates to the available energy in the physical phenomena. Non-limiting examples of embodiment sensors include temperature sensors, moisture sensors, liquid flow sensors, capillary flow sensors, magnetic sensors, piezoelectric sensors, pressure sensors, optical sensors, sensors for sensing blood glucose and other bio-medical quantities, chemical sensors, and electrical field sensors.

Conventional sensors generally require an internal battery power source or an external power source for operation as the measurement activity may involve some degree of consumption of battery power. Conventional powered sensors may consume more power to measure and report a physical quantity than the energy in the physical quantity being measured.

In the various embodiments, a self charging sensor may include an energy storage element or circuit (e.g., a capacitor) that may be charged by an energy-harvesting mechanism that harvests energy from the same physical quantity (e.g., movement or temperature) that is being measured by the sensor. A wireless transmitter within the sensor may transmit a signal whenever there is sufficient energy stored in the energy storage element to operate the transmitter. In an embodiment, the transmitter may require a specific amount of energy or be triggered when the stored energy exceeds a threshold value. The rate at which the energy harvesting mechanism charges the energy storage element may determine how often there is sufficient stored energy available to transmit signals from the self charging sensor. In this manner, a periodicity of reporting (i.e., how often wireless signals are transmitted) may provide information regarding a measurement of the phenomenon without the need for a detailed message, although other information may be sent in wireless signals. As the physical quantity or phenomenon that provides the energy being harvested increases or decreases, the rate at which the storage device is charged increases or decreases, which causes the transmitter in the sensor to transmit a signal or beacon more or less frequently. In various embodiments, the level or value of the physical quantity being sensed, the rate of energy-harvesting (e.g., charging rate), and the frequency of reporting may be correlated by a receiver device or computing device being notified when transmitted signals are received. Thus, the periodicity of the transmissions can be used by a receiver or other computing device to determine or estimate the underlying value of the physical quantity associated with the sensor.

Because a wireless self-charging sensor device harvests energy from the physical quantity that is being sensed so that the frequency with which wireless signals are transmitted can be used to determine the underlying value of the physical quantity, the wireless self-charging sensor may transmit a relatively simple signal. Thus, there may be no need to transmit actual sensor readings in some embodiments. Also, because the wireless signal does not need to include or encode data, the sensor in such embodiments need not include a processor or memory for storing data and formatting the message. As a result, the wireless self-charging sensor device may be a very simple circuit that is inexpensive to make.

In an embodiment, a wireless self-charging sensor device may include a circuit that triggers transmission of signal when the stored energy exceeds a threshold value as may be determined by a circuit that compares stored energy to a threshold value. This circuit may improve energy storage by preventing leakage through the transmitter until sufficient energy has been stored to complete a full transmission of the signal. The circuit may also improve the correlation between the rate of transmissions and the measured quantity. A circuit that compares stored energy to a threshold value may apply power from the energy storage element to the transmitter through a switch (e.g., a transistor) that is closed when the stored energy meets or exceeds the threshold. In other words, when the charge level in the energy storage element reaches or exceeds the threshold, the switch may connect the energy storage element to the transmitter (e.g. a radio module), which uses the stored power to transmit a report or simple signal. The threshold level may be an energy level necessary to transmit the signal, for example. As another example, the charge threshold may be set so as to provide sufficient power to the transmitter to enable it to transmit data from one or more additional sensors that are not used for harvesting. For example, if excess charge is available after transmission of the wireless signal from the energy harvesting sensor, additional information may be transmitted from one or more additional sensors, such as the quantity being measured (or sensor identifier) and the measurement value.

In various embodiments, since the amount of power that is consumed by transmitting a signal may vary (e.g., with temperature), a wireless self-charging sensor device may include a circuit that discharges stored energy to a base level or lower threshold after the signal has been transmitted. Such a base level or lower threshold may provide an initial reference level of the energy storage element from which energy storage begins. In this manner, the temporal correlation between charge time and the energy available in the physical quantity used for energy harvesting may be maintained. For example, a discharge circuit may be configured to fully discharge a capacitor after a signal has been transmitted and before harvested energy is used to recharge the capacitor. In such embodiments, when a report transmission is completed, a discharge circuit may reduce the charge stored in the energy storage element to the lower threshold, at which point charging of the energy storage element may resume. Thus, the discharge circuit may be used to effectively "reset" the wireless self-charging sensor device after each wireless report is transmitted, which may enable the periodicity of transmissions to be more reliably correlated to the measured phenomenon A variety of measurable physical quantities or phenomena may be used as energy sources, and thus sensed using a suitable energy harvesting circuit. For example, movement of the device or of a mechanism connected to the device may be used to generate electric power. Movement may be converted to energy through the action of mechanisms, such as through piezoelectric materials or through movement of magnets or coils.

As another example, heat energy may be used as an energy source in order to measure temperature or power. A thermoelectric energy harvesting mechanism may be used to measure temperature based on the thermal energy (i.e. heat flux) that passes through the mechanism from a one surface (e.g., a surface affixed to a patient's skin) to another surface exposed to ambient temperature. For example, a wireless self-charging sensor device configured to measure the temperature of a patient may use the heat flux passing through the device from the patient's warm skin to ambient to generate electricity for charging the transmission circuit. As the patient's temperature increases, the amount of energy generated per unit time will increase provided the ambient temperatures remained relatively constant. As the energy generation rate increases, the time required to charge an energy storage circuit (e.g., a capacitor or rechargeable battery) to a threshold level (e.g., the amount of energy required to transmit a signal) decreases. Thus, a rise in the patient's temperature may be detected by a more frequent transmission of wireless signals by the sensor. A computing device configured to receive the wireless signals or reports of signal receptions made correlate the rate at which such signals are received to the patient's temperature or changes in the patient's temperature. A further correlation may be established between the rate of generation of the wireless signal transmissions (e.g., reporting frequency) and the actual sensor value. Therefore, the wireless signaling intervals may be used as a proxy for the patient's temperature, in which case actual temperature data need not be included in the transmitted signal/report.

The invention may be used in many applications where low cost (e.g., disposable) sensors are useful and the sensed phenomenon can be used to generate sufficient power to charge the energy storage element. While the rate at which the wireless signaling signals are transmitted may be a crude measure of the phenomenon, there are many applications where a crude measure will be adequate. For example, when movement is the underlying quantity to be measured, a lack of reporting, or a zero rate of reporting, may indicate a serious condition, such as an incapacitation of a person under monitoring. Alternatively, if a movement-powered sensor is applied to a piece of equipment that is supposed to remain at rest, the second reception of wireless signals from that sensor may indicate that the equipment has been moved or is malfunctioning. For example, a movement-powered sensor could be applied to a door to sense when it is opened or closed, or to an object to sense when the object is moved. Other applications include those in which a single or one-shot report may be useful. In such examples, a single transmitted signal may indicate the phenomenon of interest. In these examples, an exact measure of the phenomenon (e.g., an amount of movement) is not necessary.

Energy harvesting sensors according to the various embodiments may have broad applications outside of monitoring medical or fitness-related quantities. Such sensors may have particular utility where small size, low cost and/or long service life are important.

As an example, a motion or acceleration energy harvesting sensor may be used in various automotive applications, such as in or on a tire to harvest energy from tire rotations and thereby provide a measure of speed.

In another example, a motion or acceleration energy harvesting sensor may be used as a theft detector when applied to an object that is ordinarily stationary and not meant to move. In this example, when movement or acceleration energy is harvested sufficient to power the transmitter, the sensor will transmit a wireless signal the reception of which will indicate to the receiver that the object is being moved. So long as the object is being moved, the sensor will periodically transmit signals, thereby providing a mechanism for roughly tracking the object. In embodiments suitable for detecting theft or movement of a normally stationary object, the transmitter may be a cellular telephone or WiFi transceiver so that the theft-related wireless signals may be received on a wide area network and appropriate authorities alerted. Examples of theft detector applications include energy harvesting sensors built into a picture frame for high value paintings, an energy harvesting patch that can be placed on construction equipment or other valuable machinery or vehicles to notify the owner when unauthorized movement is occurring.

Another example of a suitable application for a motion energy harvesting sensor is a device for monitoring pet activity. By harvesting energy from accelerations (e.g., via piezoelectric accelerometer) due the pet's movements, the sensor need not include a power supply, and thus may last a long time and fit within a very small package, such as within a dog tag or collar.

As another example, an energy harvesting sensor that harvests energy from water flowing by or through it or from a chemical reaction that occurs when the sensor is wet could be used in buildings or equipment in flood prone areas as a flood detector or flood level sensor. Because such a sensor harvests energy from water or reactions that occur only in the presence of water, the sensor need not include a battery, and thus can be made small and affordable with a very long useful life.

As another example application, a heat energy harvesting sensor may be used in a restaurant application for providing measurements of plate or food temperature by harvesting heat energy passing through the sensor from a hot plate to ambient. Another heat energy harvesting sensor application is as a fire detector.

The above examples are intended to be non-exhaustive and non-limiting, and many other practical applications for various embodiments of energy harvesting sensor are possible.

In applications in which the energy source that is being harvested and sensed can provide a steady stream of power, the sensor may include more complex circuitry, such as a controller, a threshold switch to control the application of power to the transmitter, other sensors, memory, and other circuits. In such a configuration, the transmitter may be a more complex radio module, such as a Bluetooth module or other short range wireless transceiver (e.g., WiFi). The controller may be used to control the level of charge required for handling variable transmit power levels, while maintaining the relationship between the charging rate of the energy storage element, the rate of change of the energy harvesting and sensor quantity, and the intervals between wireless signal transmissions. The controller may also format the information that is sent in transmissions so that the device can also transmit sensor data and other information. Additional information may be useful in many situations, such as during an initialization procedure of the sensor to establish baseline measurement values for the sensor. The controller may also be useful in devices that include multiple sensors, which case sensor data from the other sensors may be transmitted in the wireless signals. In such an example, the other sensors may also be self charging. The energy harvesting portions of the other sensors may be used to power reporting of the sensor data to the controller only, or may be used independently to generate separate wireless signals. In various embodiments, the other sensors may be coupled to each other or to a central sensor hub, which may be the primary reporting self charging sensor.

An example embodiment of a self charging sensor circuit 100 is illustrated in FIG. 1A. The self charging sensor circuit 100 may include an energy storage element 120, a transmitter (or transceiver) 150 coupled to the energy storage element 120, and an energy harvesting module 110 coupled to the energy storage element 120 and configured to harvest energy from an energy source 180 having a quantity $Q_1$ to be measured. The energy harvesting module 110 may be any of a number of mechanisms that can convert energy from the energy source 180 into electrical energy that may be stored in the energy storage element 120. While the energy from the energy source 180 may be converted into another form of energy as an intermediate form, electrical power is generally the desired quantity for powering the transmitter (or transceiver) 150.

The energy storage element 120 may be any of a number of storage elements including, but not limited to, a capacitor, a battery, an inductor, depending on whether a current or a voltage is more conveniently stored based on the application. A more detailed explanation of various energy harvesting mechanisms is provided herein below.

The energy storage element 120 may be coupled to a charge threshold measurement (or monitoring) element 130. The charge threshold measurement element 130 may be a simple circuit, such as a diode that becomes forward biased at a particular voltage. The charge threshold measurement element 130 may also be a more complex circuit such as a comparator circuit that compares the charge level, or voltage of the energy storage element 120 to a reference voltage level and changes state when the reference voltage level is met or exceeded. When the charge threshold measurement element 130 detects that the charge or voltage level of the energy storage element 120 reaches or exceeds the threshold, a switch 140 may be closed that couples the energy storage element 120 to the transmitter 150. The switch 140 may be any known switch, such as a transistor or gate. The stored charge in the energy storage element 120 may power the transmitter 150 to enable it to transmit a wireless signal 151 from an antenna 150a.

The energy storage element 120 may optionally be coupled to a discharge threshold measurement (or monitoring) element 160. The discharge threshold measurement element 160 may also be a simple circuit, such as a diode that becomes forward biased at a specified voltage. The charge threshold measurement element 160 may also be a more complex circuit such as a comparator circuit that compares the charge level or voltage of the energy storage element 120 to a reference voltage level and changes state when the reference voltage level is met or exceeded. Generally, the discharge threshold measurement may be made after a wireless transmission 151. When the charge threshold measurement element 160 detects that the charge or voltage level of the energy storage element 120 exceeds the discharge threshold after a wireless transmission 151, a switch 170 may be activated that couples the energy storage element 120 to a ground or shorts the element through a resistor (not shown). The stored charge in the energy storage element 120 may be reduced to a discharge reference level such that a new charging cycle may begin from that level. By discharging the energy storage element 120 to a discharge reference level, the timing relationship between the rate of charge and the transmission of wireless signals may be made more repeatable or reliable. In various embodiments, the charge threshold measurement element 130 and the discharge threshold measurement element 160 may be integrated into a single circuit or correlated so the state of one may depend upon the state of the other.

As discussed above, due to the time required to charge the energy storage element 120 by the energy harvesting module 110, which depends upon the amount of energy available from the energy source 180 being measured, the transmitter 150 will transmit wireless signals 151 periodically, separated one from the other by a time $\Delta t_i$. Thus, the rate of charge of the energy storage element 120 depends upon the energy available from the energy source 180, and the rate of charge determines the time $\Delta t_i$ between when wireless signals 151 are transmitted.

Figure 1B:
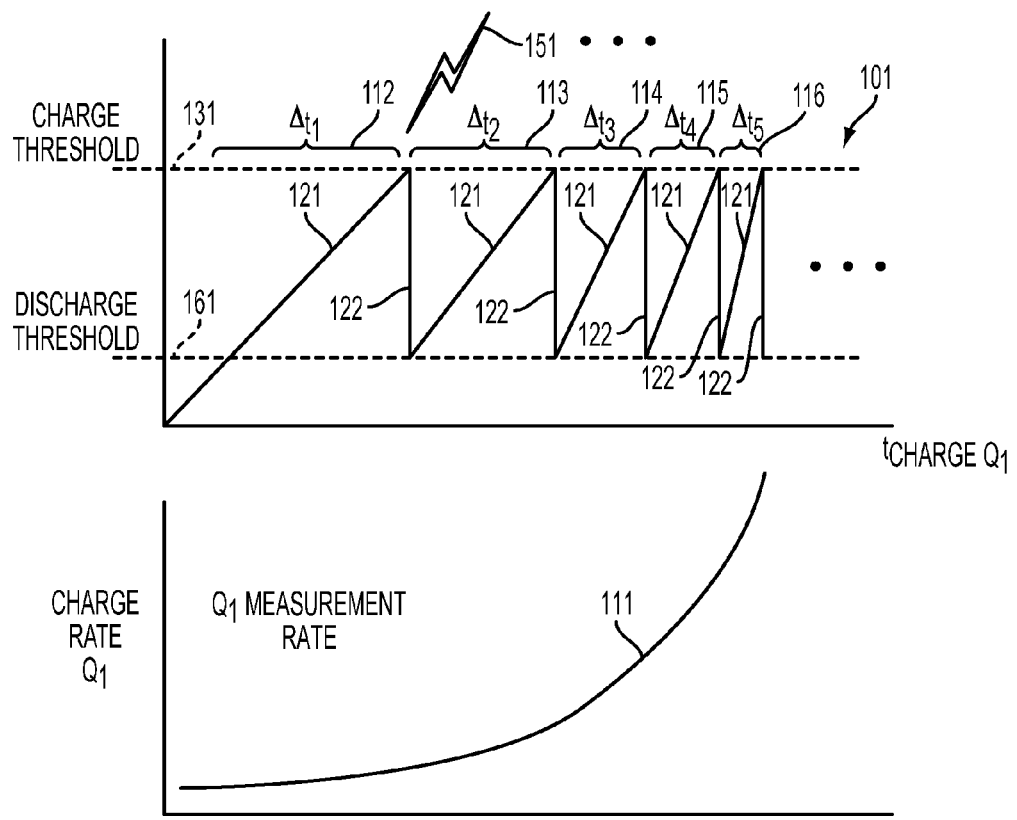
FIG. 1B is a diagram illustrating a relationship between a charge level, charge and discharge thresholds, and a reporting frequency according to various embodiments.

The relationships between charging rate and transmission periods $\Delta t_i$ are illustrated in FIG. 1B, which illustrates an example in which the charging rate is increasing with time (e.g., the temperature is rising). Depending on the rate of charge 111, a charge value 121 in the energy storage element 120 increases until it reaches the charge threshold 131 during a charge interval $\Delta t_i$ 112. When the charge value 121 reaches the charge threshold 131, the transmitter has sufficient power to transmit a signal, so the wireless signal 151 is transmitted. Powering the transmitter discharges the energy storage element as shown in the discharge portion 122 of the charge profile. The discharge portion 122 may also result in part from a discharge circuit that discharges the energy storage element to the discharge threshold as described above.

As the energy available from the energy source increases, and thus the rate of charge 111 increases, the charge intervals $\Delta t_2$ 113, $\Delta t_3$ 114, $\Delta t_4$ 115, $\Delta t_5$ 116 (i.e., the time required for the charge 121 to rise from the discharge threshold 161 to the charge threshold 131), which relate to the intervals between wireless signal transmissions, decrease so wireless signals are transmitted more frequently. This is illustrated in FIG. 1B by the decreasing intervals $\Delta t_2$ through $\Delta t_5$ between wireless signal transmissions. Thus, a receiver may determine that the measured energy source is increasing in energy by observing that the intervals between signal transmissions are decreasing. Conversely, if the rate of charge 111 were progressively decreasing (i.e., energy in the energy source is decreasing) a corresponding progressive increase in the interval between wireless transmissions would be observed. Thus, by determining the differences between subsequent intervals between wireless signals, a receiver can determine whether the underlying physical quantity that is the source of energy harvested by the sensor, and thus to be measured by the sensor, is increasing or decreasing.

Figure 2A:
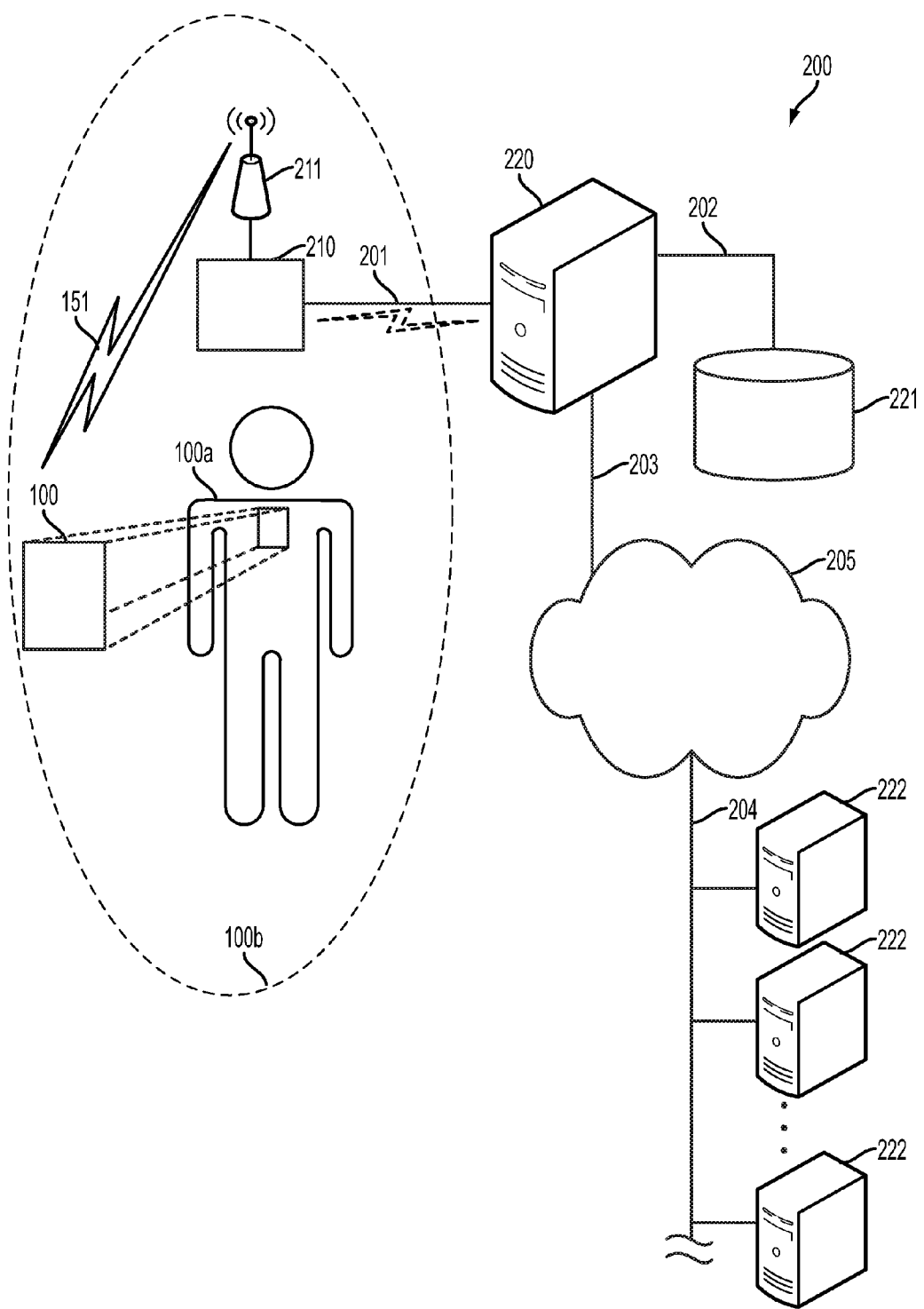
FIG. 2A is a diagram illustrating an embodiment system for a self-charging sensor including a receiving station, a local server and data store, a network and system servers.

In various embodiments, the self charging sensor 100 may be part of a communication system 200 for receiving wireless signals from the sensor, interpreting the signals, and taking actions, an example of which is illustrated in FIG. 2A. As an example, a communication system 200 may include a medical system, fitness system, or other system for monitoring quantities, including medical or biomedical quantities associated with a patient 100a in a monitoring environment 100b. The monitoring environment 100b may be a home environment, an office environment, a medical care giving environment, or any environment where the patient 100a is located and where a monitoring device, such as a receiver (or transceiver) 210 is located. The receiver 210 may be configured with an antenna 211 that is capable of receiving signals such as the wireless signal 151 from the sensor 100. The receiver 210 may be a specially configured receiver or may be a receiver such as a wireless access point, a wireless router, a mobile communication device or other device capable of receiving the wireless signal 151. An access point may provide wireless access to a local area network (LAN), a wireless LAN (WLAN), a private local area network, a service provider providing access to a public network such as the Internet, or a combination of public and private networks, including medical service provider networks and other related networks.

The receiver 210 may be coupled through a wired or wireless connection 201 to a computing device, such as a server 220, which may be part of a home or office network, or may be a public network or a network associated with a medical service provider, fitness facility or other location. The server 220 may include a mass storage device 221 coupled through a connection 202. The server 220 and the storage device 221 may be configured to receive and store wireless signals 151 in order to monitor sensed quantities associated with the patient 100a.

The server and the storage device 221 may store information such as correlation, correspondence, or other information that may be used to convert the wireless signal 151, and the transmission time intervals into a measurement quantity associated with the sensor 100. The conversion of transmission time intervals $\Delta t_i$ into a measurement quantity in the server may be accomplished with reference to information that may be used to correlate signal reception intervals (or how frequently the wireless signals 151 are received) to measurement quantities, trends or changes in signal reception intervals, transmission rates of the sensor quantity as a function of the change in the sensed quantity, initial values, deviations from initial values, and other information.

The initial values may be estimated, predetermined, or may be received from the sensor 100 during an initialization or calibration procedure. The server 220 may further be connected to the Internet 205 through a connection 203, which may be a wired or wireless connection. The connection 203 to the Internet 205 may provide a capability for the server 220 to exchange information with a medical server or servers 222 that may form part of a medical service system. The server or servers 222 may be configured to collect the information associated with the sensor 100 for patient care purposes. The server or servers 222 may also be used to provide additional information to the server 220 such as sensor correspondence values or other information that may be useful to conducting monitoring operations as described herein.

Figure 2B:
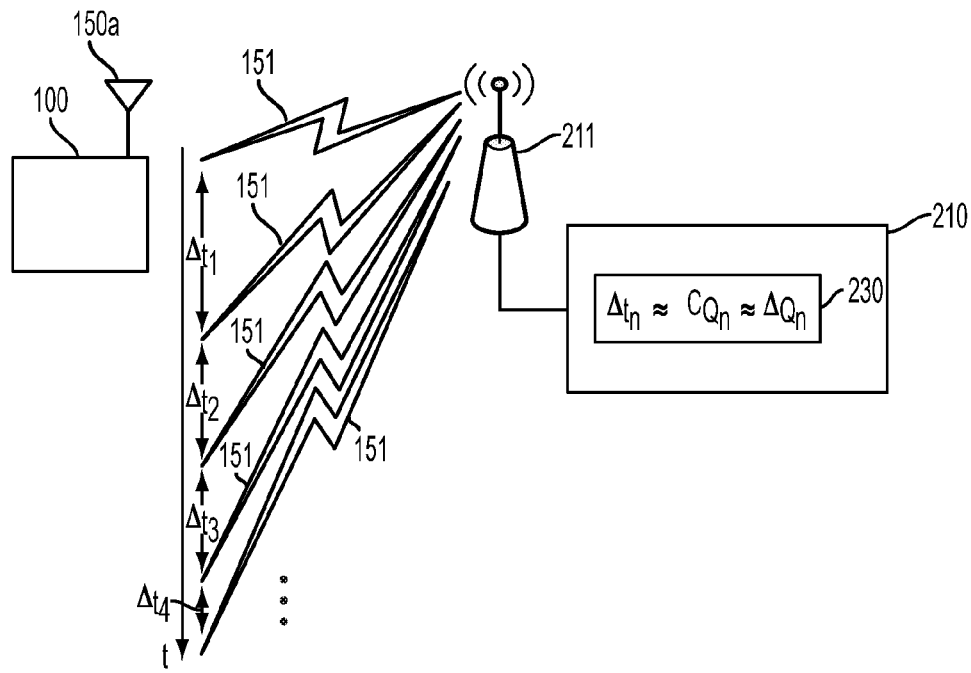
FIG. 2B is a diagram illustrating an embodiment sensor report transmission and reception.

As illustrated in FIG. 2B, a series of the wireless signals 151 may be transmitted at various times by the sensor 100 through the antenna 150, and are received by the receiver 210, through the antenna 211. The wireless signals 151 may be transmitted at various times when the level of charge from the energy harvesting quantity Q of the sensor 100 reaches a charging threshold as described herein. As the wireless signals 151 are received, at intervals $\Delta t_1$, $\Delta t_2$, $\Delta t_3$, $\Delta t_4$, and so on, a correspondence 230 between the times and the level of the measurement quantity Q may be developed in the receiver 210. The correspondence 230 may equate a reception interval $\Delta t_n$ with a charge value $C_{Qn}$ based on the measurement quantity Qn, and a corresponding change in the underlying measurement quantity $\Delta Q_n$.

In an embodiment, a sensor 100 may be configured with more than one sensing and/or energy harvesting units, such as an energy harvesting quantity $Q_1$ element 180, an energy harvesting or sensor quantity $Q_2$ element 320, an energy harvesting or sensor quantity $Q_3$ element 330, up to an energy harvesting or sensor quantity $Q_n$ element 340, for sensing and/or harvesting energy from respective quantities $Q_1$, $Q_2$, $Q_3$, up to $Q_n$. The energy harvesting quantity $Q_2$ element 320, the energy harvesting quantity $Q_3$ element 330, up to the energy harvesting quantity $Q_n$ element 340 may be coupled to the energy harvesting module 110 through lines 321, 331, and 341, respectively. In an embodiment, each of the energy harvesting quantity $Q_i$ elements 320, 330, 340 may be used for energy harvesting to power the sensor 100.

Alternate harvesting elements may be used, for example, when the particular harvesting quantity becomes of interest. Alternate harvesting elements may also be used, for example, when a current harvesting quantity is providing insufficient energy to power the transmitter 150 or other circuits within the sensor 100. A controller 310 may be used to control monitoring of the multiple energy harvesting elements and the generation of wireless signals. In various embodiments, the wireless signal 151 may be generated as described above based on the energy harvesting quantity $Q_1$ element 180, the energy harvesting module 110 and the energy storage element 120. That is, when the primary quantity of interest for monitoring and energy harvesting $Q_1$, wireless signals 151 powered by the energy harvested from that quantity $Q_1$ may be generated periodically when the charge level of the energy storage element 120 reaches (or exceeds) the transmission threshold 130. When the charge level of the energy storage element 120 reaches the transmission threshold 130, the controller 310 may activate the switch 140 and the wireless signal 151 may be sent to the transmitter 150 and transmitted over the antenna 150*a*.

In another embodiment, only one energy harvesting element (e.g., energy harvesting quantity $Q_1$ element 180) may be used to charge the energy storage element 120 while the other elements 320, 330, 340 are sensors that generate a data signal corresponding to their respective measured sensor value. In this embodiment, data from such other sensors may be encoded in the wireless signals transmitted by the sensor 100 when there is sufficient energy stored in the energy storage element 120. When additional energy is available after transmission of the wireless signal 151, sensor information from the other sensor elements 320, 330, 340 may be transmitted in another wireless signal or report. Alternatively, the sensor data from the other sensor elements 320, 330, 340 may be read by the controller 310 and encoded in a data packet transmitted within the wireless signal 151. After the initial transmission is completed, or together with the transmission associated with the wireless signal 151, the controller 310 may activate the switch 350 to transfer the sensor information from the other sensor elements 320, 330, 340 to the transmitter 150 for transmission over the antenna 150*a*. If the charge level remains above the discharge threshold 160 at that point, the controller 310 may active a switch 170 to discharge the energy storage element 120 back to the discharge level so as to reset the charge level of the energy storage element 120. The charge level of the energy storage element 120 may be reset to a reference level in order to preserve a charge timing relationship between the primary measurement quantity $Q_1$, the charge rate achieved by harvesting energy from the quantity Q1, the charge level on the energy storage element 120 or transmit, and the generation of the wireless signals 151.

Figure 3A:
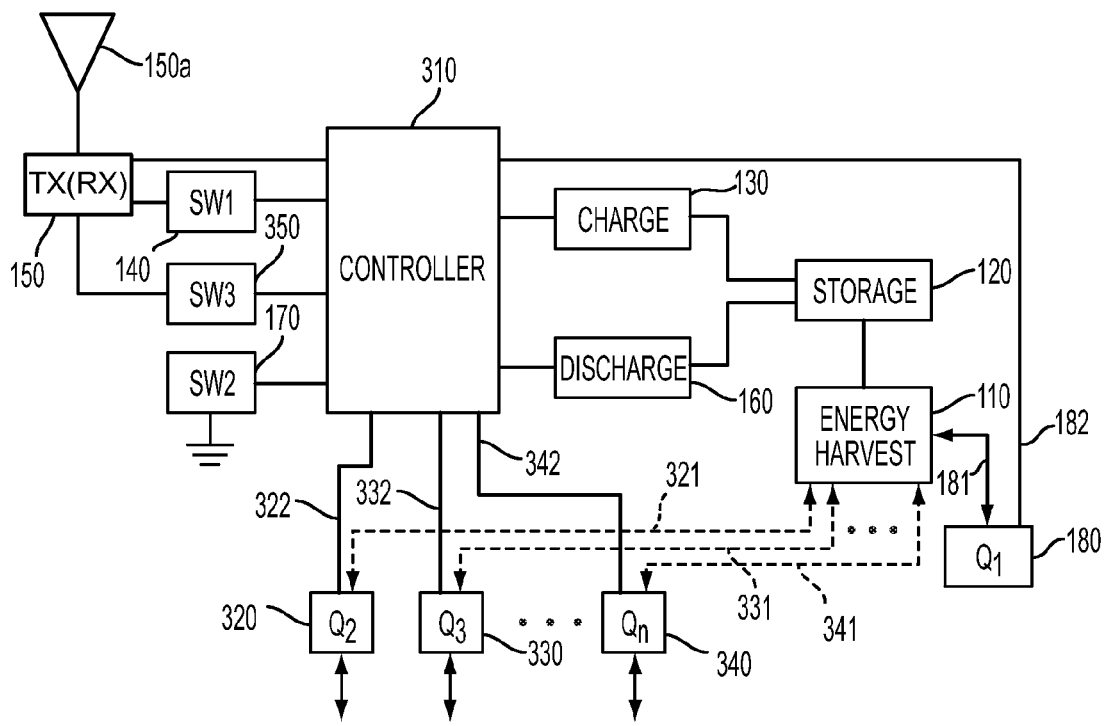
FIG. 3A is a block diagram illustrating an embodiment self charging sensor circuit with a controller and multiple energy harvesting modules.
Figure 3B:
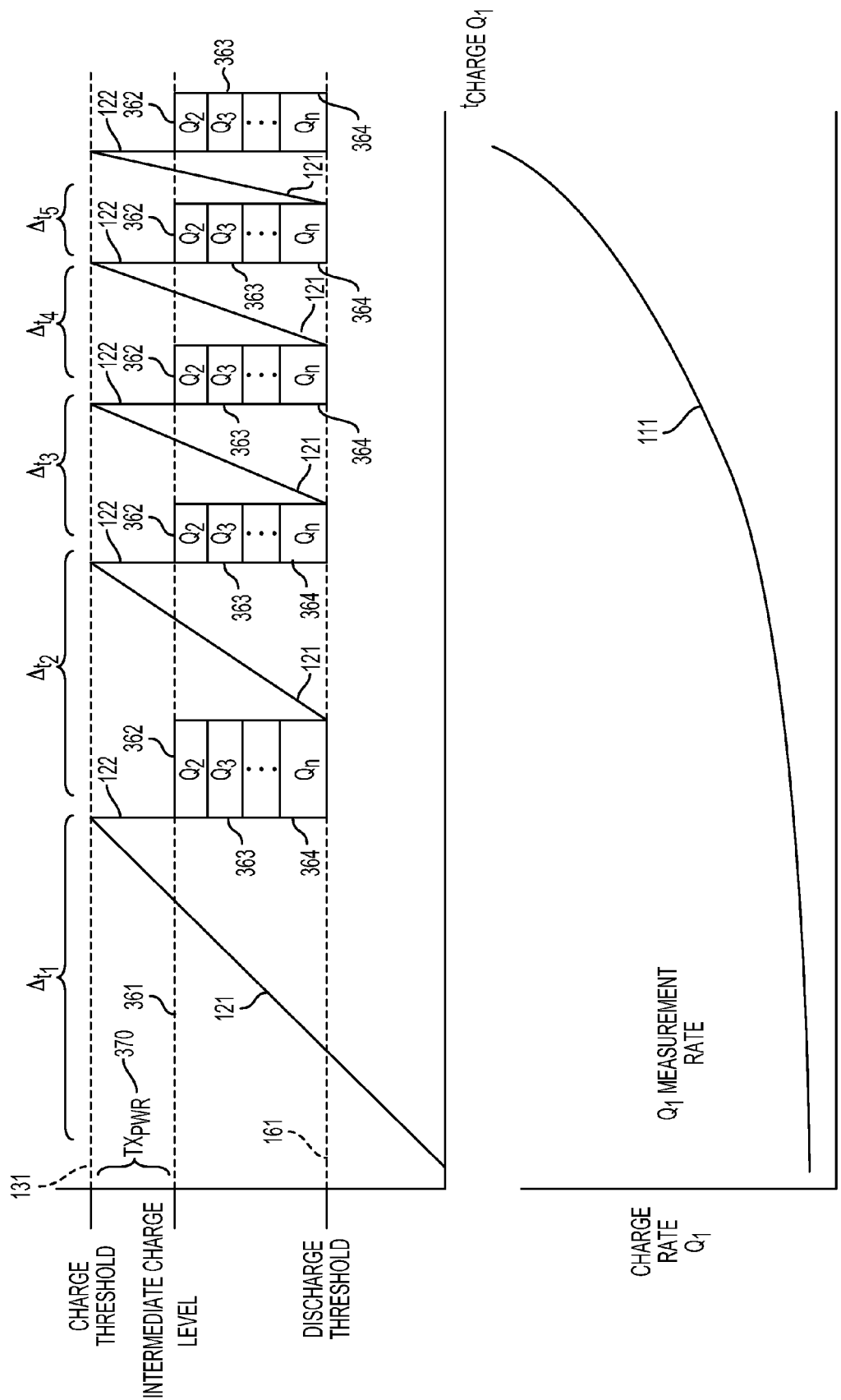
FIG. 3B is a diagram illustrating a relationship between a charge level, charge, auxiliary, and discharge thresholds, a reporting frequency and auxiliary reporting according to multi sensor, multi threshold embodiments.

With reference to FIG. 3B, as the charge rate 111 associated with the quantity Q1 and the energy harvesting quantity $Q_1$ element 180 increases, a charge may be harvested and stored on the energy storage element 120. As the charge level on the energy storage element 120 increases during a charging interval 121 $\Delta t_1$, data from other sensor and harvesting elements may be monitored. When the level of charge on the energy storage element 120 reaches the charge threshold 131, a wireless signal 151 may be generated as discussed above. The transmission of the wireless signal 151 may consume an amount of power 370 that causes the charge level to reach an intermediate charge level 361. When the intermediate charge level 361 is sufficiently above the discharge threshold 161, there may be sufficient charge in the energy storage element 120 to transmit additional information regarding the additional sensors for quantities $Q_2$, $Q_3$, up to $Q_n$. Thus, after or together with the transmission of the wireless signal 151, a $Q_2$ sensor data value 362, a $Q_3$ sensor data value 363, up to a $Q_n$ sensor data value 364 may be transmitted in a wireless signal using the remaining charge on the energy storage element 120. The additional information may be similarly transmitted when the respective charging intervals 121 for interval $\Delta t_2$, interval $\Delta t_2$ interval $\Delta t_3$, interval $\Delta t_4$, and interval $\Delta t_5$, such as when the threshold 161 is reached and when the respective transmission of the wireless signal 151 reduces the charge level to the intermediate level 361. In conditions in which transmission conditions are generally constant during the operation of the sensor, the transmit power may be fairly constant. Thus, the intermediate level 361 may remain at a generally consistent level. In such a case, it can be expected that a consistent number of sensor data values may be transmitted after or together with the wireless signals 151.

In the present example, the intervals between transmissions of the wireless signals 151 will depend on the rate of harvesting of energy from the measurement quantity Q1. Thus, the $Q_i$ sensor data values 362, 363, 364 may include more detailed information, such as encoded sensor values. Including detailed information may be necessary because no correlation is established between the charging time of the energy storage element 120 based on the quantities $Q_2$, $Q_3$, . . . $Q_n$. However, in other embodiments, more than one quantity may be used for harvesting and for generating the wireless signals 151 when respective charge levels reach a charge threshold. In further embodiments, multiple independent sensors elements may be deployed on a patient and may independently harvest and transmit the wireless signals 151 for different quantities using, for example, separate independent storage elements and transmitters. In such embodiments, because of the possibility of collisions among the wireless signals 151 from the multiple sensors, the wireless signal transmissions may be coordinated, such as through a network arrangement between sensors. In a network embodiment, the multiple sensors may be connected to each other or to a central element.

Figure 3C:
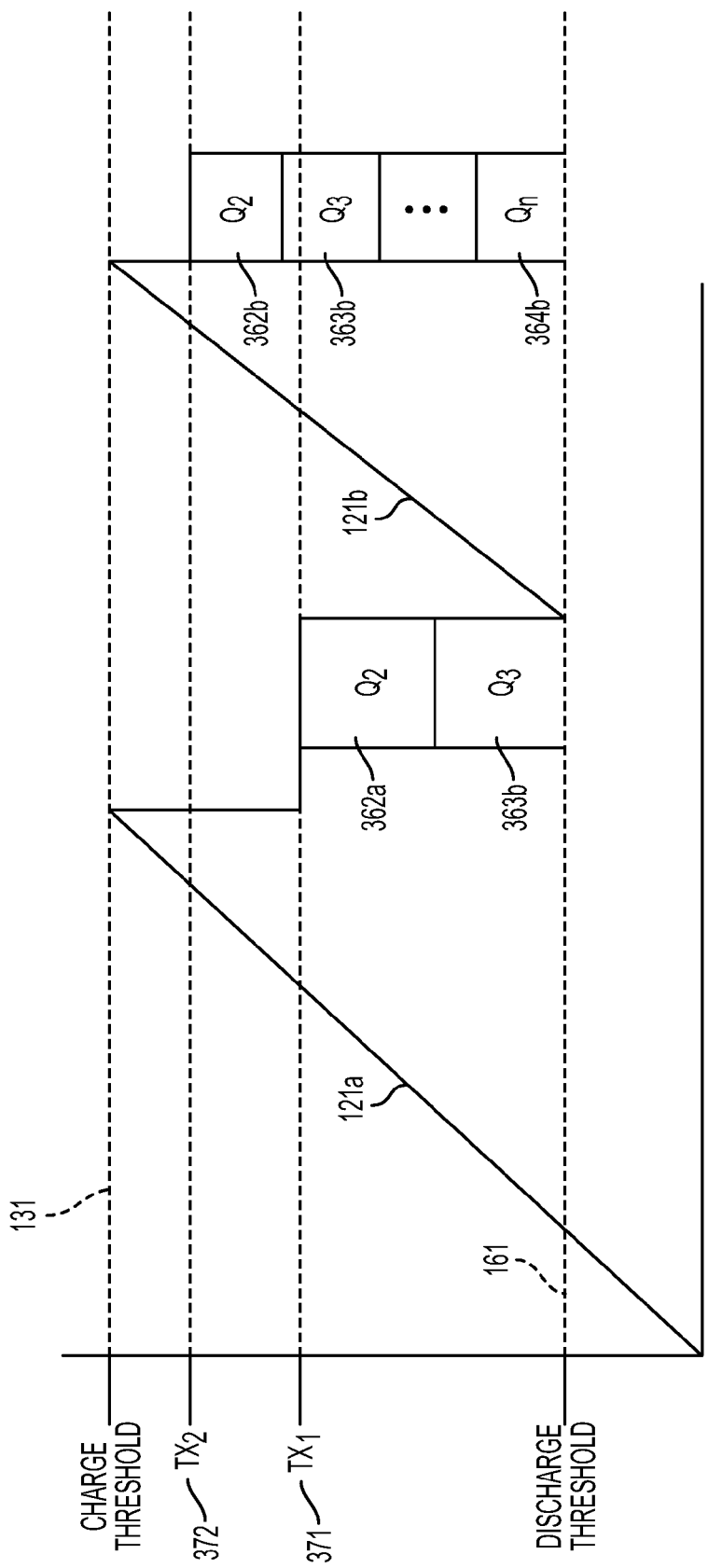
FIG. 3C is a diagram illustrating charge and discharge thresholds, variable transmit power thresholds, a reporting frequency and variable auxiliary reporting in an example multi sensor, multi threshold device according to various embodiments.

In various embodiments in which the transmission conditions are variable, the transmit power required to transmit a wireless signal 151 may also be variable. In such a case, as illustrated in FIG. 3C, a variable number of sensor data values may be transmitted depending on the intermediate charge remaining after a report transmission. During a charging interval 121a, when the charge level of the energy storage element 120 reaches or exceeds the charge threshold 131, the wireless signal 151 may be generated and transmitted. The transmission of the wireless signal 151 may result in an intermediate charge level 371 for a first transmission $TX_1$ of the wireless signal 151. During a charging interval 121b, when the charge level of the energy storage element 120 reaches or exceeds the charge threshold 131, the wireless signal 151 may be generated and transmitted. The transmission of the wireless signal 151 may result in an intermediate charge level 372 for a second transmission $TX_2$ of the wireless signal 151. Because the transmission conditions at the time of the first transmission $TX_1$ of the wireless signal 151 may result in a relatively large amount of transmit power being required compared to the power required for the second transmission $TX_2$ of the wireless signal 151, fewer sensor data values are transmitted in connection with the first transmission. Depending on the difference between the intermediate charge levels 371 and 372 and the discharge threshold 161, it may be determined how many sensor data values may be transmitted. For example, based on the charge level reaching the intermediate threshold 371, a sensor data value $Q_2$ 362a and a sensor data value $Q_3$ 363b may be transmitted after or together with the first transmission $TX_1$ of the wireless signal 151. Based on the charge level reaching the intermediate threshold 372, which is relatively higher than the intermediate threshold 371, a sensor data value $Q_2$ 362b, a sensor data value $Q_3$ 363b up to a sensor data value Qn 364b may be transmitted using the remaining charge on the energy storage element 120.

A controller may determine the remaining charge level and how many sensor values may be transmitted. Alternatively, a controller may attempt to transmit as many sensor values as possible until all sensor values have been transmitted or until the discharge threshold 161 is reached. It may not be necessary to re-transmit sensor values as the values are periodically transmitted after or with the wireless signals 151. When transmitting all of the sensor values does not deplete the charge in the energy storage element 120, the energy storage element 120 may be discharged fully to the discharge threshold 161 to reset the charging interval.

Figure 4A:
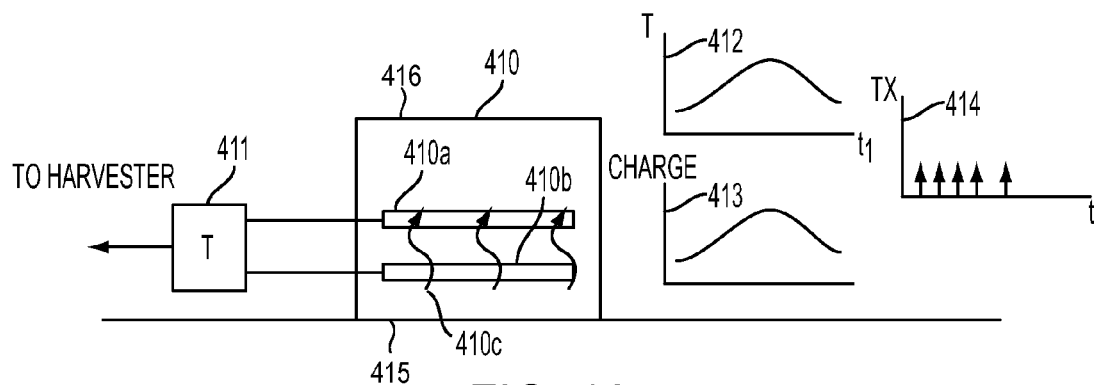
FIG. 4A is a diagram illustrating an embodiment temperature sensing and energy harvesting module.

Energy harvesting may be accomplished a variety of energy harvesting mechanisms configured to extract energy from a number of energy sources, some non-limiting examples of which are illustrated in FIG. 4A, FIG. 4B, FIG. 4C, and FIG. 4D. For example, a temperature sensor 410 may be based on a heat-based energy harvesting element 411, such as thermoelectric elements, as illustrated in FIG. 4A. in this example, the temperature sensor 410 may contain thermoelectric elements 410a and 410b through which a heat flux 410c may flow from a hot side 415 that may be placed on a surface whose temperature is to be measured, and a cool side 416 that may be exposed to a heat sink, such as ambient conditions. Such a sensor may generate power that results in a periodicity of wireless transmissions that depends on the difference in temperature between the two surfaces. The thermoelectric elements 410a and 410b may be coupled to an energy harvesting element 411. An electrical potential may be developed across the thermoelectric elements 410a and 410b that may be harvested as energy and stored in an energy storage element. The temperature sensor 410 may be affixed to the skin of a patient to determine changes in the skin temperature based on a reference such as an ambient air temperature. Thus, when the difference between the air temperature and the skin temperature of the patient is relatively large, more energy may be harvested.

Figure 4B:
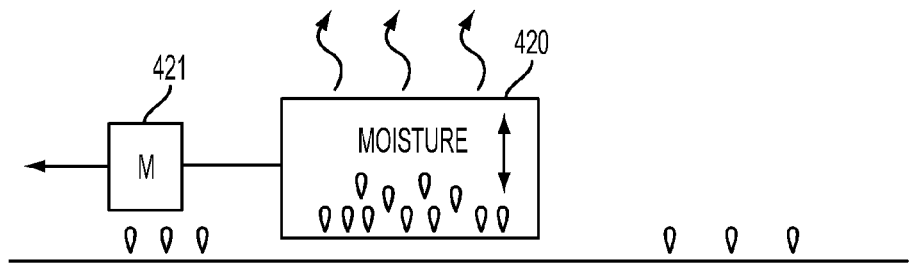
FIG. 4B is a diagram illustrating an embodiment moisture sensing and energy harvesting module.

In another embodiment illustrated in FIG. 4B, a moisture sensor 420 may be configured from an energy harvesting element 421 that generates electrical energy when exposed to moisture. Such a moisture sensor 402 may be affixed to the skin of a patient to detect the presence of perspiration, blood, or other bodily fluid emanating from the patient in the area of the moisture sensor 420. In an embodiment, the moisture may be used to generate an electrical charge that can be stored. As an example, the energy harvesting circuit may be two dissimilar metals configured to form a galvanic cell when water, particularly salty water as from perspiration or blood, contacts both metals. The electrical charge may be used by the energy harvesting module 421 to charge a storage element. The moisture sensor 420 may also operate from chemical (e.g., electrolytic) action between the source of the moisture and reacting elements within the moisture sensor 420. The charge generated from the chemical action or reaction may be used by the energy harvesting module 421 to charge an energy storage element. In an example, blood glucose may be used as an energy source that can be harvested when reacted with certain chemicals. As another example, the moisture may cause a material to expand causing a mechanical action that may be converted into an electrical charge. Other moisture based energy harvesting mechanisms may be possible.

Figure 4C:
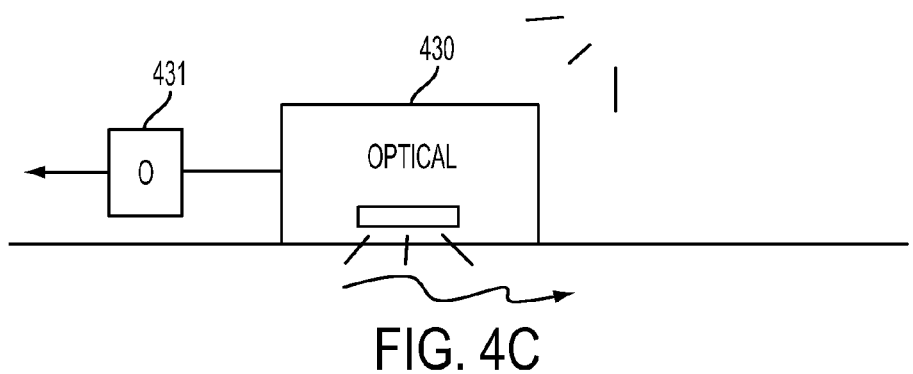
FIG. 4C is a diagram illustrating an embodiment optical sensing and energy harvesting module.

In another embodiment illustrated in FIG. 4C, an optical sensor 430 may be configured from an optical-based energy harvesting element 431 that generates electrical energy from light. The optical sensor 430 may be a simple solar cell that can harvest ambient light energy and use that energy to charge an energy storage element that powers the wireless transmitter.

Figure 4D:
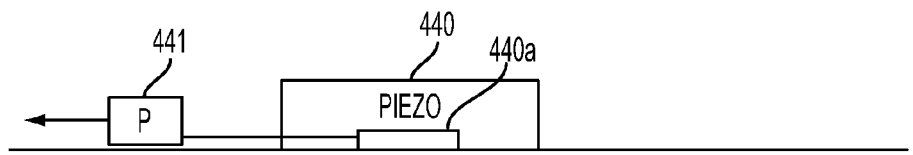
FIG. 4D is a diagram illustrating an embodiment piezoelectric sensing and energy harvesting module.

In another embodiment illustrated in FIG. 4D, a motion, mechanical displacement or pressure sensor 440 may be configured from a movement or displacement energy harvesting element 441 that harvests electrical energy from mechanical energy. An example of such a mechanical sensor 440 includes a piezoelectric element 440a configured to generate an electrical signal in response to vibration, mechanical displacement, pressure, or similar mechanical forms of energy. Such a mechanical sensor 440 may be affixed to the skin of a patient and configured to transmit wireless signals periodically as powered by a pressure based quantity, such as a pulse of the patient. As the piezoelectric element 440a generates electrical potentials, such electrical signals may be rectified and used by the energy harvesting element 441 to charge an energy storage element.

The above non-limiting example embodiments are not intended to be exhaustive and are meant to illustrate how energy can be harvested from phenomena or quantities to be measured by appropriate energy harvesting mechanisms. Additional implementation details are not provided as individual implementation may vary widely.

In an example embodiment, the sensor may be packaged as a flexible unit that may be applied to the skin of a patient, such as with an adhesive backing that at least partially covers a surface of the sensor. The sensor may also have at least a portion of the surface of the sensor that contacts the skin of the patient reserved for allowing interaction between the energy harvesting portion of the sensor and the energy harvesting quantity. Alternatively, the sensor adhesive portion may be adapted to absorb or transfer the energy harvesting quantity to the energy harvesting portion of the sensor.

Figure 5A:
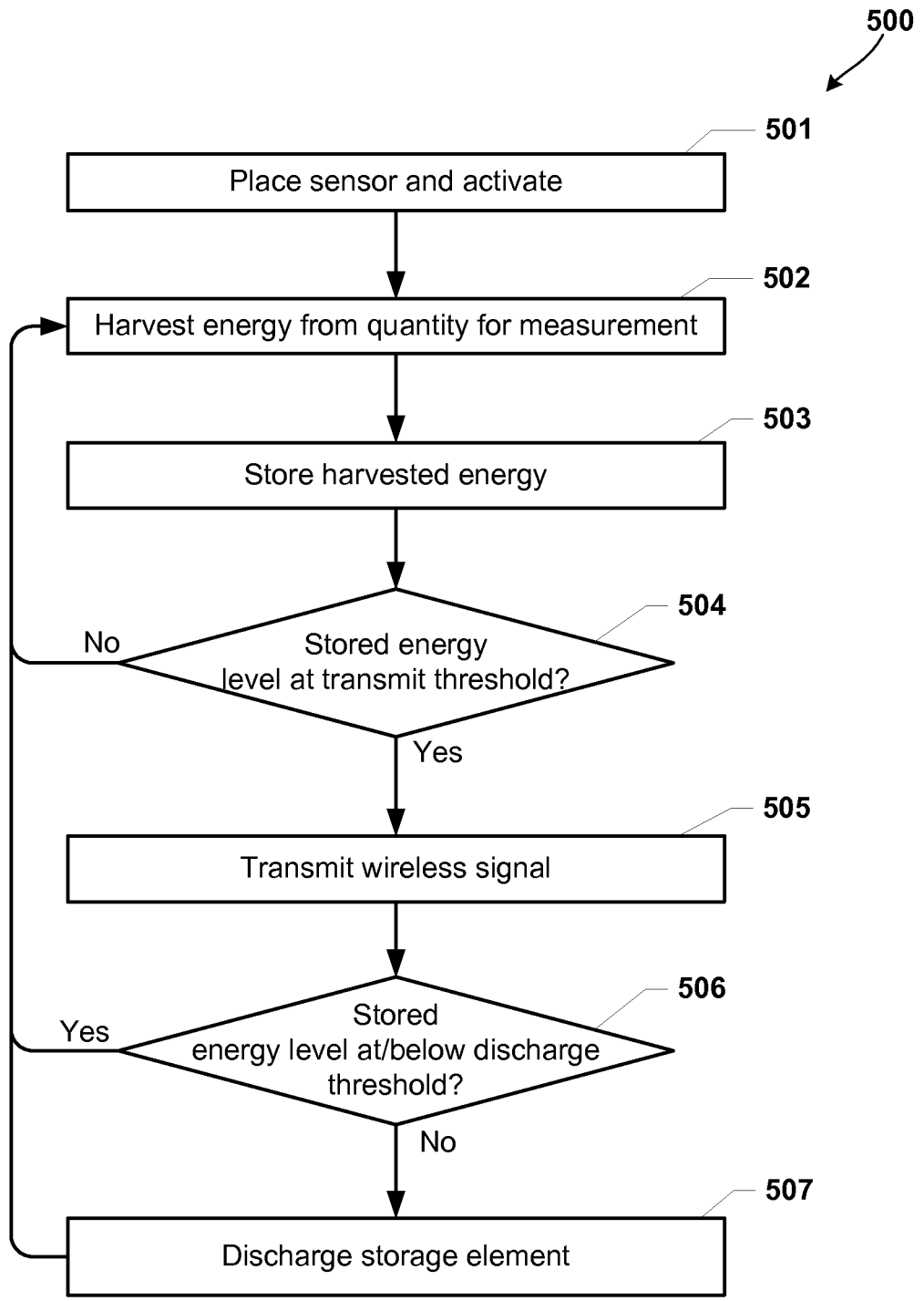
FIG. 5A is a process flow diagram illustrating an embodiment method of harvesting energy from a sensed quantity and generating wireless signals at an interval that depends on the rate of harvested energy.

FIG. 5A illustrates an embodiment method 500 for measuring a quantity $Q_1$ using an energy harvesting sensor such as may be applied to a patient. The sensor may be placed on an appropriate portion of the patient and activated in block 501. When the sensor is activated, there may be a period of initialization during which initial values are set or calibrated, such as setting the stored energy level of the energy storage element to the discharge threshold and establishing or calibrating an initial sensor value. Alternatively, the energy storage element may be pre-charged to a stored energy level. The initialization procedure may involve an initial transmission from the transmitter in order to establish that a receiver configured to listen for the sensor wireless signals can receive the wireless signals emitted by the sensor. During the initialization procedure, initial values of the sensor may be sent, for example in a detailed format, so that the subsequent transmission of wireless signals may be calibrated to represent changes from the initial value.

When activated, the sensor may begin to harvest energy from the quantity for measurement (e.g., temperature, movement, etc.) in block 502. Energy from the quantity of interest for measurement may be harvested at a rate that depends upon on the magnitude or changes in magnitude of the amount of harvestable energy in the quantity for measurement. The harvested energy may be stored in the energy storage element in block 503. The stored energy may be tested against a threshold, such as by a processor or a threshold circuit in determination block 504. The transmission threshold may be a level or an amount of stored energy sufficient to operate the transmitter to transmit the wireless signal, and possibly other information. When the amount of stored energy is at or above the transmission threshold (i.e., determination block 504="Yes") the energy in the energy storage element may be applied to the transmitter causing it to transmit a wireless signal in block 505.

After the transmission of the wireless signal, a circuit or processor may determine whether there is any residual energy stored in the energy storage element by comparing energy stored in the energy storage circuit to a discharge threshold in determination block 506. When the residual energy stored in the energy storage element is above a discharge threshold (i.e., determination block 506="No"), the energy storage element may be discharged, such as through activation of a switch that discharges the energy storage element to ground or through a resistor in block 507. The sensor may return to charging in block 502. When the residual energy stored in the energy storage element is at or below the discharge threshold (i.e., determination block 506="Yes"), the sensor may return to charging in block 502.

In order for the time period $\Delta t_i$ between transmissions of the wireless signals to be used as a measure of the quantity to be measured the relationship between the charge time of the energy storage element and the amount of energy harvested from the quantity being measure should remain approximately predictable. For this reason, any discharge of the energy storage element in block 507 may be accomplished rapidly to preserve the timing relationship. If the discharge requires a constant time period, that time period may be factored into calculations used to determine a measurement of the measured quantity.

Figure 5B:
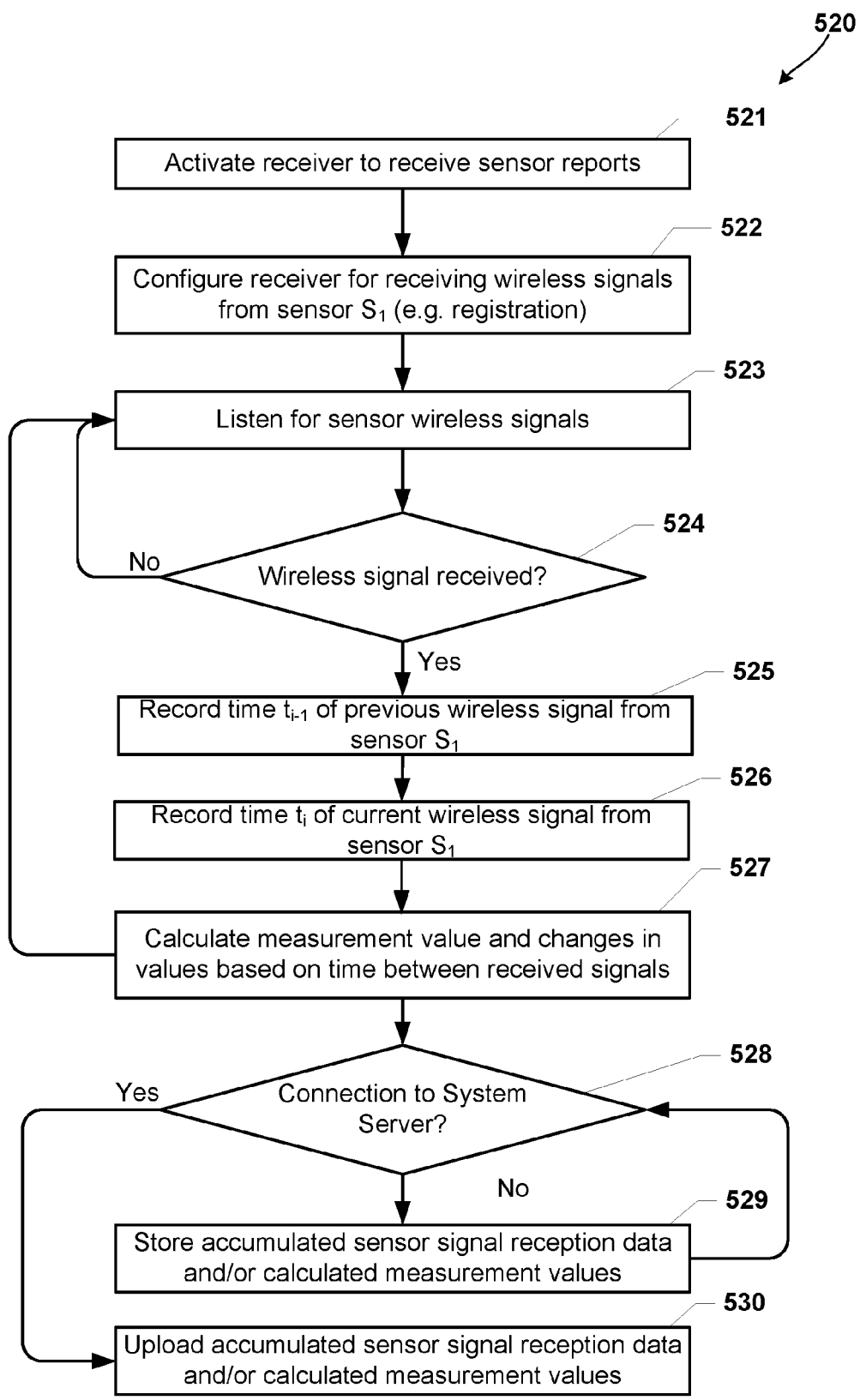
FIG. 5B is a process flow diagram illustrating an embodiment method of receiving and processing wireless signals from a self charging sensor.

An embodiment method 520 of operations that may be performed by a receiver that receives wireless signals from a self charging or energy harvesting sensor is illustrated in FIG. 5B. A receiver may be active or initialized to begin receiving sensor wireless signals in block 521. As described above, in some embodiments the sensor may send an initialization wireless signal or report that contains initial values for the sensor or that can be used by a receiver to calibrate the sensor. In some embodiments, such a sensor report may be transmitted responsive to receiving a wireless signal from the receiver. In other embodiments, the sensor may be configured to transmit the wireless signal without prompting from the receiver. In such embodiments, the receiver must "listen" for the wireless signals. Therefore, some amount of coordination may exist between the placement and activation of the sensor and the placement and activation of the receiver. For example, the receiver may be activated first. The sensor may then be placed and activated. Upon generation of the first report from the sensor, whether an initialization report or a first report based on self charging, the receiver is ready to receive the wireless signal.

In various embodiments, the receiver may be specifically configured to receive transmitted sensor wireless signals from the sensor S1 based on the quantity Q1 in block 522. Such configuration may occur as part of a registration process. In such a process, the receiver may be part of a computer system where information about, for example, the patient, the sensor, the quantity being monitored, and other information may be entered prior to beginning a monitoring session. The configuration and registration process may also allow the receiver to prepare for receiving wireless signals related to a particular quantity (e.g., Q1). The receiver may retrieve stored information related to the measurement of that quantity. The information may include information that provides a correlation or correspondence between report reception frequency and the quantity of interest (e.g., Q1).

The receiver, when active, may begin to listen for sensor wireless signals in block 523. Listening may refer to monitoring an air interface, a radio channel, frequency or other radio frequency resource for wireless signals corresponding to those transmitted by the sensor using the sensor transmitter. Because other signals may be present in the radio environment, some mechanism for identifying the transmission, such a sensor identifier may be necessary. In other embodiments, a dedicated frequency or code may be employed to identify the transmission. Since the wireless signals are transmitted when a certain charge level is reached in the sensor, the wireless signals may be transmitted at any time. Therefore, the receiver may be configured to receive the wireless signals at all times. When a wireless signal is not received (i.e., determination block 524="No"), the receiver may continue listening for wireless signals in block 523. When a wireless signal is received (i.e., determination block 524="Yes"), the time $t_i$ at which the signal is received may be recorded or stored as a report from sensor $S_1$ and a quantity $Q_1$ in block 525. The receiver may then return to monitoring or listening for the next sensor wireless signal in block 523. The receiver may receive a series of transmissions and record the reception times that may then be used to calculate the duration between received transmissions.

In block 527 the receiver (or a computing device receiving reception time data from the receiver) may calculate a measurement value (e.g., $Q_1$) based on the latest wireless signal receipt time difference $\Delta t_{i-1}$ that may be calculated as the difference between the time of reception of the current wireless signal $t_i$ recorded in block 526 and the time of reception $t_{i-1}$ of the previous received wireless signal. The time difference $\Delta t_{i-1}$ may be used to calculate the measurement value for the quantity $Q_1$ by applying that difference to a correlation formula or conversion factor stored in memory. As described above, a relationship between harvestable energy and time to charge the energy storage element to the transmission threshold may be configured to be repeatable, so that a correlation formula or conversion factor may be observed for a given sensor (e.g., during manufacture or during the configuration operations in block 522 discussed above) or configured as part of the design of the sensor. The correlation formula or conversion factor may be stored in memory of the receiver (or a computing device receiving reception time data from the receiver) in a variety of ways, such as part of an application, as part of the configuration operations in block 522, or as an upload from a server based on an identifier on the sensor (e.g., provided in a bar code that can be scanned by the receiver). Thus, a measure of the quantity Q1 as well as changes or trends in that quantity (e.g., $\Delta Q_1$) may be determined in block 527 based on a sequence of durations between transmissions recorded in block 526. Because the receiver has no knowledge of any delays in the wireless signaling intervals, such as from discharging the energy storage element, when considering the sensor configuration, the time $\Delta t_{i-1}$ may reflect the charging time or duration that depends on the energy harvested from the measurement quantity Q1.

The receiver (or a computing device receiving reception time data from the receiver) may be configured to send stored sensor information to a server, such as a server that is part of a medical data system. Because the receiver device may connect to the server only periodically, the receiver may determine whether it is connected to the server in determination block 528. When the receiver is not connected to the server (i.e., determination block 528="No"), the receiver may accumulate the sensor data in memory in block 529. Such accumulated sensor data may include the recorded signal receipt times, data that has been calculated from the wireless signals, and information about the sensor, patient, receiver device, etc. Then, when the receiver is connected to the server (i.e., determination block 528="Yes"), the accumulated sensor data may be uploaded or otherwise transferred to the server in block 530. The information may be uploaded through a data session established between the receiver and the server, or between a computing device to which the receiver is connected and the server.

Figure 5C:
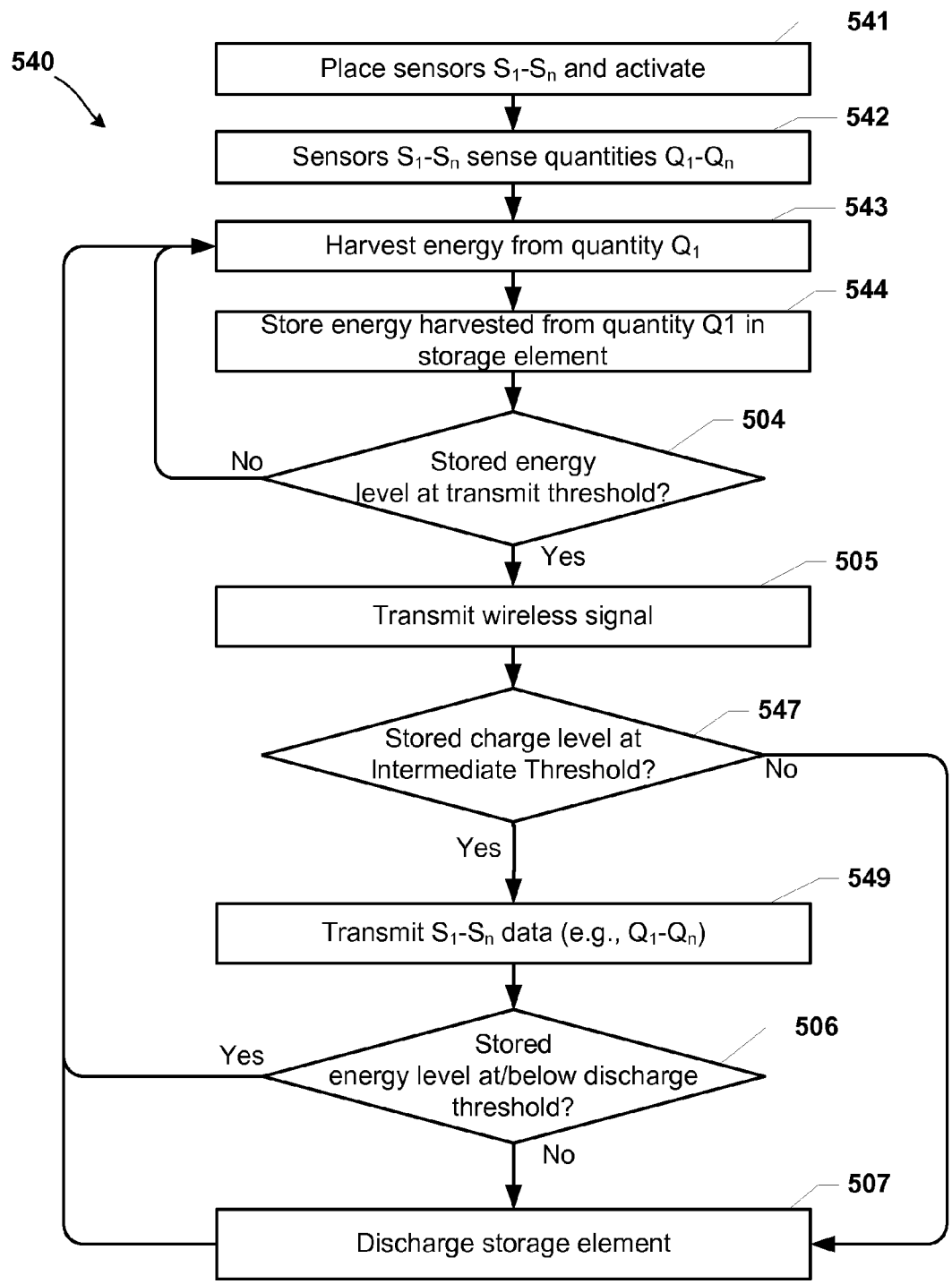
FIG. 5C is a process flow diagram illustrating an embodiment method of harvesting energy from a sensed quantity, generating wireless signals at an interval that depends on the rate of harvested energy and that may include data from additional sensors.

As described above, in some embodiments multiple sensors may be present in an energy harvesting sensor. An embodiment method 540 that may be executed by a sensor including multiple sensors is illustrated in FIG. 5C. The sensor may be implemented as an assembly that may contain multiple sensors for sensing different quantities or phenomena, or for sensing different magnitudes of the same quantity or phenomenon. In some embodiments, one of the sensors may be an energy harvesting mechanism used for generating the energy used to power the transmissions of wireless signals as described above with reference to FIG. 5A. In other embodiments, some or all of the multiple sensors may also have an energy harvesting element for harvesting energy from the quantity measured by the sensor. Though The sensor assembly may be packaged as a flexible unit which may be applied to a skin of a patient.

The sensor assembly and/or the individual sensors may be placed on an appropriate portion or portions of the object to be sensed (e.g., a patient) and activated in block 541. When the sensor assembly is activated, there may be a period of initialization during initial values are measured or the sensors calibrated, such as setting at least one energy storage element to the discharge threshold and establishing or calibrating initial sensor values. Alternatively, the energy storage element associated with at least one of the energy harvesting elements may be pre-charged and pre-initialized. The initialization procedure may involve an initial transmission from the transmitter in order to establish a communication with a receiver that is configured to listen for the sensor wireless signals. During the initialization procedure, initial values of the sensor or sensors may be transmitted so that subsequent transmissions of wireless signals may be calibrated by a receiver to represent changes from the initial value and to establish initial values for other sensors.

When activated, sensors, such as sensors $S_1$-$S_n$ may begin to sense their respective quantities $Q_1$-$Q_n$ in block 542. At least one of the sensors, such as $S_1$ may be configured to harvest energy from the quantity $Q_1$ in block 543. As energy is harvested from the quantity of interest Q1, the energy storage element may be charged in block 544 with the stored energy level monitored in determination block 504 as described above with reference to FIG. 5A. When the charge level in the energy storage element is at or above the transmission threshold (i.e., determination block 504="Yes") a wireless signal may be transmitted in block 505.

In determination block 547 a circuit or controller may determine whether the stored charge is at or exceeds an intermediate threshold sufficient to support a second or encoded wireless signal transmission. If the charge level of the energy storage element is at or above the intermediate threshold (i.e., determination block 547="Yes"), sensor data from some or all of the sensors $S_1$-$S_n$ may be transmitted in block 549. In an embodiment, only data from those sensors not used to harvest energy, such as sensors $S_2$-$S_n$ associated with the quantities $Q_2$-$Q_n$, may be transmitted since the periodicity of the wireless signal transmitted in block 505 may be used to calculate the measurement value of $Q_1$ as described above with reference to FIG. 5B. When the charge level associated with harvesting Q1 is not at an intermediate threshold (i.e., determination block 547="No"), the energy storage element may optionally be discharged in block 507, such as through activation of a switch that discharges the energy storage element to ground or through a resistor in order to reset the energy storage element.

After transmission of sensor data values in block 549, a circuit or controller may determine whether the energy stored in the energy storage element is at or above a discharge threshold in determination block 506. When the energy stored in the energy storage element associated with the quantity Q1 exceeds the discharge threshold (i.e., determination block 507="No"), the energy storage element may be discharged to a discharge threshold level in block 507, such as through activation of a switch that discharges the energy storage element to ground or through a resistor in order to reset the energy storage element. If the energy stored in the energy storage element associated with the quantity Q1 is at or below the discharge threshold (i.e., determination block 507="Yes"), energy harvesting may continue in block 543 to again store energy in the energy storage element in block 544.

Transmission of sensor data in block 549 and discharge of the energy storage element in block 507 may be accomplished rapidly to preserve the timing relationship between the measured quantity and the interval between wireless signal transmissions.

Figure 5D:
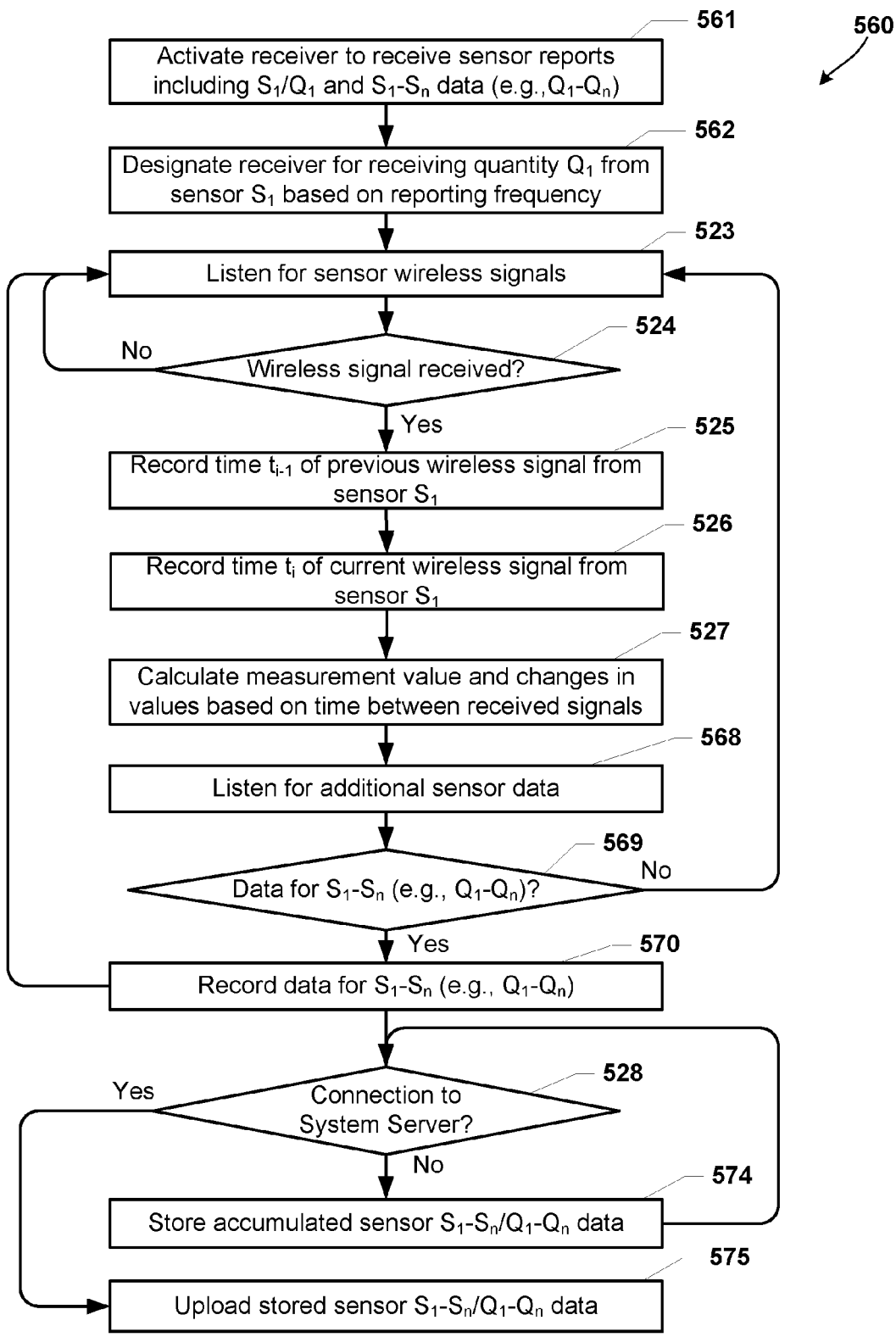
FIG. 5D is a process flow diagram illustrating an embodiment method of receiving and processing wireless signals from a self charging sensor that may include data from additional sensors.

An embodiment method 560 that may be performed by a receiver that receives wireless signals from a multi-sensor self charging or energy harvesting sensor is illustrated in FIG. 5D. A receiver may be active or initialized to receive sensor wireless signals and sensor data from additional sensors $S_1$-$S_n$ in block 561. As described above, in some embodiments the sensor may send an initialization wireless signal or report that contains initial values for the sensor or that can be used by a receiver to calibrate the sensor. In some embodiments, such a sensor report may be transmitted responsive to receiving a wireless signal from the receiver. In other embodiments, the sensor may be configured to transmit only. In such embodiments, the receiver must "listen" for the wireless signals. Therefore, some amount of coordination may exist between the placement and activation of the sensors and the placement and activation of the receiver. For example, the receiver may be activated first. The sensors may then be placed and activated. The sensors that are not used for energy harvesting may be activated before the sensor that is used for or associated with energy harvesting so that sensor values for all of the sensors are ready when the wireless signal is generated. Upon transmission of calibration or initialization signals from the sensor, the receiver may be ready to receive the wireless signal and additional sensor data.

When placing and activating sensors, one of the sensors may be designated as the sensor from which wireless signals are received, e.g. sensor S1 and quantity Q1 in block 562. When the receiver is activated and initialized, the receiver may begin to monitor or listen for wireless signals in block 523. Listening may involve monitoring an air interface, a radio channel, frequency or other radio frequency resource for wireless signals transmitted by the sensor using the sensor transmitter. Since the wireless signals are transmitted when a certain charge level is reached in the sensor, the wireless signals may be transmitted at any time. Therefore, the receiver may be configured to receive the wireless signals at all times during a monitoring session. So long as a wireless signal is not received (i.e., determination block 524="No"), the receiver may continue listening for wireless signals in block 523. When a wireless signal is received (i.e., determination block 524="Yes"), the time $t_i$ at which the signal is received may be recorded or stored as a report from sensor $S_1$ and a quantity $Q_1$ in block 525.

In block 527 the receiver (or a computing device receiving reception time data from the receiver) may calculate a measurement value (e.g., $Q_1$) based on the latest wireless signal receipt time difference $\Delta t_{i-1}$ that may be calculated as the difference between the time of reception of the current wireless signal $t_i$ recorded in block 526 and the time of reception $t_{i-1}$ of the previous received wireless signal. The time difference $\Delta t_{i-1}$ may be used to calculate the measurement value for the quantity $Q_1$ by applying that difference to a correlation formula or conversion factor stored in memory. As described above, the correlation formula or conversion factor may be stored in memory of the receiver (or a computing device receiving reception time data from the receiver) in a variety of ways, such as part of an application, as part of the configuration operations in block 522, or as an upload from a server based on an identifier on the sensor (e.g., provided in a bar code that can be scanned by the receiver). Thus, a measure of the quantity Q1 as well as changes or trends in that quantity (e.g., $\Delta Q_1$) may be determined in block 527 based on a sequence of durations between transmissions recorded in block 526.

The receiver may listen for wireless signals from the sensor transmitting additional sensor data in block 568 and determine whether any such signals are received in determination block 569. When data for at least some of the sensors $S_1$-$S_n$ is received (i.e., determination block 569="Yes"), the received sensor data may be recorded in memory in block 570, such as in a local storage memory accessible to the receiver or in memory of a computing device coupled to the receiver. After receiving and recording the sensor data or when no additional sensor data is received, (i.e., determination block 569="No"), the receiver may continue to listen for a wireless signal in block 523. In alternative embodiments, the receiver may be configured to continuously listen for wireless signals and may conduct processing of received signals in blocks 565-570 as signals are received without suspending the listening for further wireless signals.

As described above, the receiver (or a computing device receiving reception time data from the receiver) may be configured to send stored sensor information to a server, such as a server that is part of a medical data system. Because the receiver device may connect to the server only periodically, the receiver may determine whether it is connected to the server in determination block 528. While the receiver is not connected to the server (i.e., determination block 528="No"), the receiver may accumulate the data from all of the sensors, as well as signal reception times and any calculated quantities in memory in block 574. When the receiver is connected to the server (i.e., determination block 528="Yes"), the accumulated sensor data may be uploaded or otherwise transferred to the server in block 575. The information may be uploaded through a data session established between the receiver and the server, or between a computing device to which the receiver is connected and the server.

Figure 6:
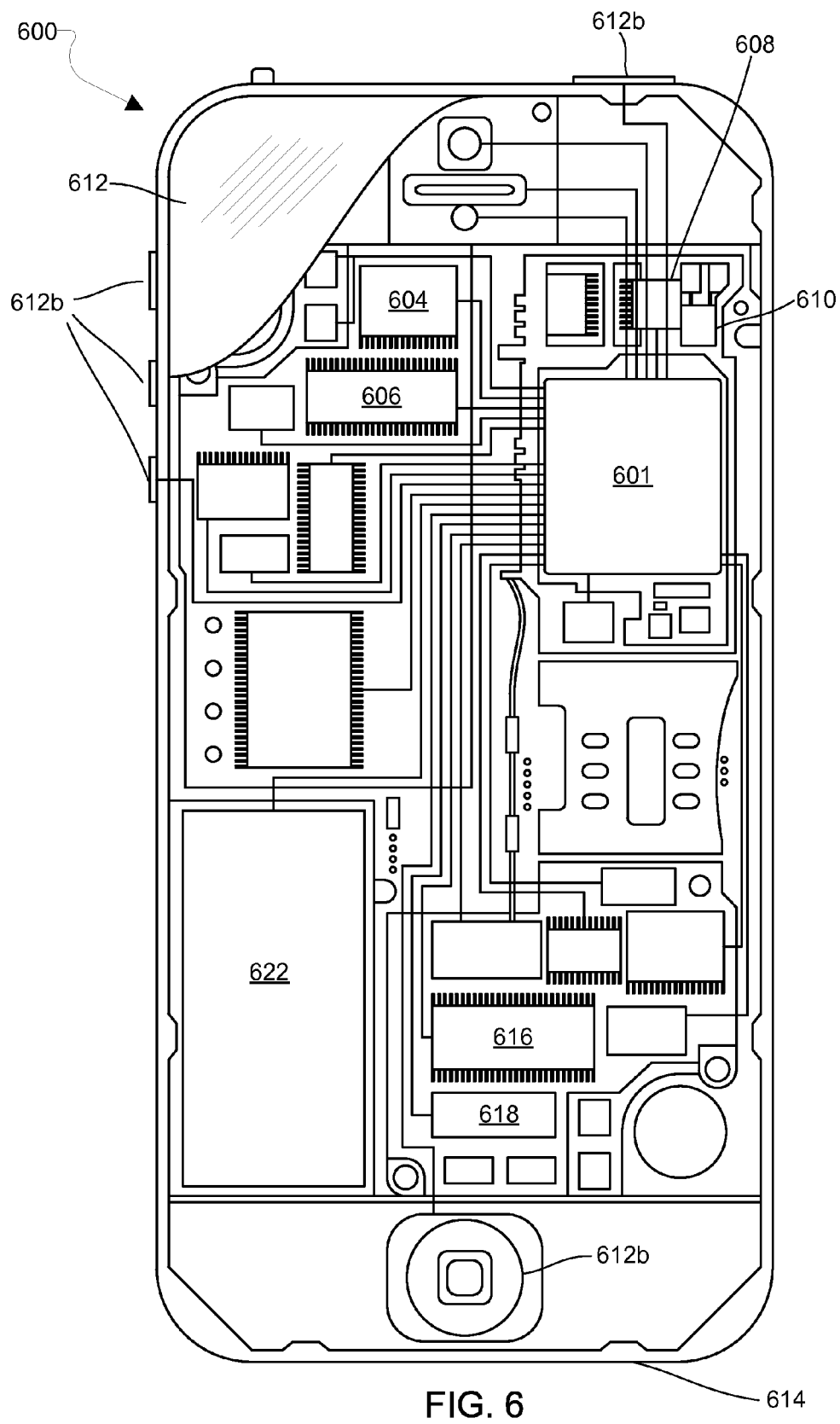
FIG. 6 is a component block diagram illustrating an example mobile computing device suitable for use with the various embodiments.

The receivers used to receive and process sensor wireless signals may be implemented in and/or with any of a variety of communication devices, such as a mobile computing device 600 as illustrated in FIG. 6. Typical mobile computing device 600 will have in common the components illustrated in FIG. 6. For example, the mobile computing devices 600 may include a processor 601 coupled to internal memories 604 and 606 for storing information. Internal memories 604 and 606 may be volatile or non-volatile memories, and may also be secure and/or encrypted memories, or unsecure and/or unencrypted memories, or any combination thereof. The processor 601 may also be coupled to a touch screen display 612, such as a resistive-sensing touch screen, capacitive-sensing touch screen infrared sensing touch screen, or the like. In some embodiments, the display of the mobile computing devices 600 need not have touch screen capability.

The mobile computing devices 600 may have one or more radio signal transceivers 608 (e.g., Peanut®, Bluetooth®, Zigbee®, Wi-Fi, RF radio) and an antenna 610, or antenna module for coupling to an antenna device, for sending and receiving radio signals, including receiving wireless signals from embodiment sensors. The radio signal transceivers 608 may be coupled to each other and/or to the processor 601. The mobile computing devices 600 may include a cellular network wireless modem chip 616 that enables communication via a cellular data network (e.g., CDMA, TDMA, GSM, PCS, 3G, 4G, LTE, or any other type of cellular data network) and is coupled to the processor 601. The mobile computing devices 600 may include a peripheral device connection interface 618 coupled to the processor 601. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port. The mobile computing devices 600 may also include a speaker 614, or speakers, for providing audio outputs. The mobile computing devices 600 may include a power source 622 coupled to the processor 601, such as a rechargeable battery. The rechargeable battery may also be coupled to the peripheral device connection port to receive a charging current from a source external to the mobile computing devices 600. The mobile computing devices 600 may also include a GPS receiver coupled to the processor 601 for determining locations of the device. Mobile computing devices 600 may also include physical buttons 612*b* for receiving user inputs.

Figure 7:
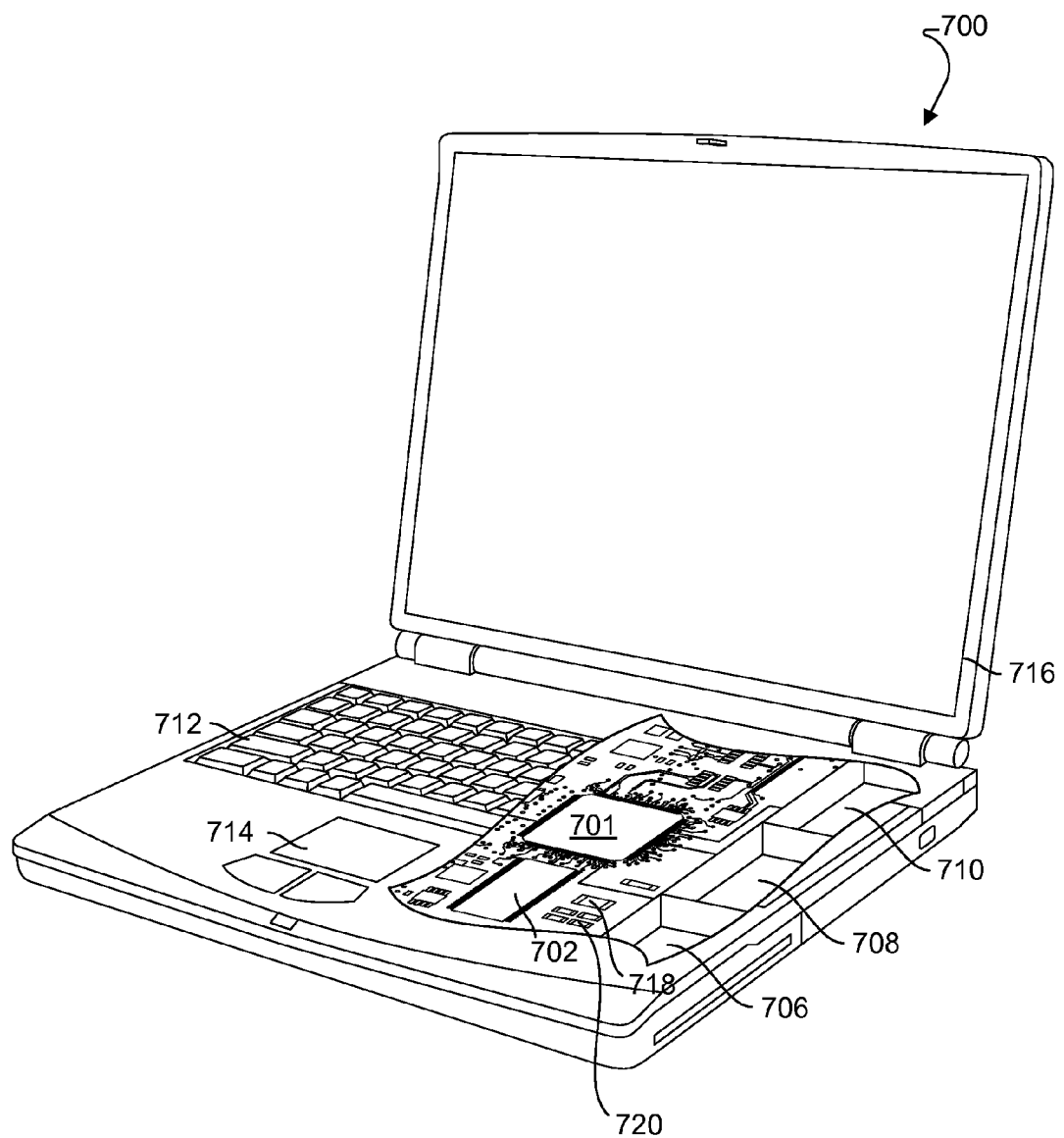
FIG. 7 is a diagram illustrating a computing device suitable for use with the various embodiments.

The embodiment methods for calculating measurement quantities based upon the duration between received wireless signals described above may also be implemented within a variety of personal computing devices, such as a laptop computer 700 as illustrated in FIG. 7. A laptop computer 700 will typically include a processor 701 coupled to volatile memory and a large capacity nonvolatile memory, such as a flash memory device 702. The laptop computer 700 may also include a floppy disc drive and a compact disc (CD) drive coupled to the processor 701. The laptop computer 700 may also include a number of network transceivers or network connector ports 706 coupled to the processor 701 configured to enable the processor 702 to communicate with other computing devices one or more wired or wireless networks. As a particular example, the network transceivers of a laptop computer 700 may include Ethernet, USB or FireWire® connector sockets/transceivers, one or more wireless modem transceivers, such as Wi-Fi and/or cellular data network transceivers, coupled to one or more antenna for sending and receiving electromagnetic radiation. The laptop computer 700 may also include other types of network connection circuits for coupling the processor 701 to a network that may be developed in the future. In a notebook configuration, the computer housing 705 includes the touchpad 707, the keyboard 708, and the display 709 all coupled to the processor 701.

The processors 601, 701 may be any programmable microprocessor, microcomputer or multiple processor chip or chips that can be configured by software instructions (applications) and transformed into a special purpose processor to perform a variety of functions, including the functions, procedures, algorithms or other processes of the various embodiments described herein. In some mobile devices, multiple processors may be provided, such as one processor dedicated to wireless communication functions and one processor dedicated to running other applications. Typically, software applications may be stored in the internal memory 602, 702 before they are accessed and loaded into the processor 601, 701. The processor 601, 701 may include internal memory sufficient to store the application software instructions and other information.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The functions in the various embodiments may be implemented in hardware, software, firmware, or any combination thereof. If implemented in software, the functions may be stored as one or more processor-executable instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A sensor device, comprising:
    an energy harvesting element configured to harvest energy from a source of energy to be measured by the sensor device;
    an energy storage element configured to store energy generated by the energy harvesting element;
    a transmitter circuit coupled to the energy storage element and configured to transmit a wireless signal when the energy stored in the energy storage element is sufficient to power transmission of the wireless signal; and
    a discharge circuit coupled to the energy storage element and configured to discharge the energy storage element after the wireless signal is transmitted by a transmitter, the discharge circuit comprising:
        a resistor; and
        a discharge threshold circuit configured to connect the resistor to the energy storage element when the energy stored in the energy storage element after the wireless signal is transmitted by the transmitter exceeds a discharge threshold.

2. The sensor device of claim 1, wherein the transmitter circuit comprises:
    a transmitter;
    an antenna coupled to the transmitter; and
    a transmission threshold circuit configured to connect the transmitter to the energy storage element when the energy stored in the energy storage element satisfies a transmission threshold.

3. The sensor device of claim 1, wherein a transmission threshold circuit and the discharge threshold circuit comprise a controller configured with processor executable instructions to perform operations comprising:
    determining when the energy stored in the energy storage element satisfies a transmission threshold and the discharge threshold;
    connecting the transmitter to the energy storage element in response to determining that the energy stored in the energy storage element satisfies the transmission threshold; and
    connecting the resistor to the energy storage element after connecting the transmitter to the energy storage element in response to determining that the energy stored in the energy storage element exceeds the discharge threshold.

4. The sensor device of claim 3, further comprising a plurality of sensors coupled to the controller and configured to measure different quantities, wherein the controller is configured with processor executable instructions to perform operations further comprising:
    determining when the energy stored in the energy storage element after the transmitter circuit transmits the wireless signal satisfies an intermediate threshold sufficient to enable transmission of sensor data by the transmitter; and
    causing the transmitter to transmit sensor data from at least one of the plurality of sensors in response to determining that the energy stored in the energy storage element satisfies the intermediate threshold.

5. A method of measuring a quantity, comprising:
    harvesting energy from a source of energy to be measured using an energy harvesting circuit in a sensor device;
    storing the harvested energy in an energy storage circuit of the sensor device;
    transmitting a wireless signal by a transmitter of the sensor device using energy stored in the energy storage circuit when the stored energy is sufficient to power the transmitter to transmit the wireless signal;
    receiving wireless signals from the transmitter in a receiving device;
    determining intervals between receptions of wireless signals from the transmitter; and
    calculating measures of the quantity based on the determined intervals between receptions of wireless signals from the transmitter,
    wherein a measure of the quantity is based on an interval between transmissions by the transmitter.

6. The method of claim 5, further comprising discharging the energy storage circuit after the wireless signal is transmitted by the transmitter.

7. The method of claim 5, further comprising determining whether the quantity is changing based on whether the determined intervals between receptions of wireless signals from the transmitter are changing.

8. The method of claim 5, further comprising:
    storing as sensor data at least one of: the determined intervals between receptions of wireless signals and the calculated measures of the quantity;
    connecting to a server; and
    transferring the stored sensor data to the server.

9. A system for measuring a quantity, comprising:
    a sensor device; and
    a receiving device,
    wherein the sensor device comprises:
        an energy harvesting element configured to harvest energy from a source of energy to be measured by the sensor device;
        an energy storage element configured to store energy generated by the energy harvesting element; and
        a transmitter circuit coupled to the energy storage element and configured to transmit a wireless signal when the energy stored in the energy storage element is sufficient to power transmission of the wireless signal, and wherein the receiving device comprises:
        a receiver circuit configured to receive wireless signals transmitted by the sensor device;
        a memory; and
        a processor coupled to the receiver circuit and the memory, wherein the processor is configured with processor executable instructions to perform operations comprising:
            determining intervals between receptions of wireless signals received from the sensor device by the receiver circuit; and
            calculating measures of the quantity based on the determined intervals between receptions of wireless signals from the sensor device.

10. The system of claim 9, wherein the transmitter circuit comprises:

a transmitter;

an antenna coupled to the transmitter; and a transmission threshold circuit configured to connect the transmitter to the energy storage element when the energy stored in the energy storage element satisfies a transmission threshold.

11. The system of claim 10, wherein the sensor device further comprises a discharge circuit coupled to the energy storage element and configured to discharge the energy storage element after the wireless signal is transmitted by the transmitter.

12. The system of claim 11, wherein the discharge circuit comprises:

a resistor; and a discharge threshold circuit configured to connect the resistor to the energy storage element when the energy stored in the energy storage element after the wireless signal is transmitted by the transmitter exceeds a discharge threshold.

13. The system of claim 12, wherein the transmission threshold circuit and the discharge threshold circuit comprise a controller configured with processor executable instructions to perform operations comprising:

determining when the energy stored in the energy storage element satisfies the transmission threshold and the discharge threshold;

connecting the transmitter to the energy storage element in response to determining that the energy stored in the energy storage element satisfies the transmission threshold; and connecting the resistor to the energy storage element after connecting the transmitter to the energy storage element in response to determining that the energy stored in the energy storage element exceeds the discharge threshold.

14. The system of claim 13, wherein the sensor device further comprises a plurality of sensors coupled to the controller and configured to measure different quantities, wherein the controller is configured with processor executable instructions to perform operations further comprising:

determining when the energy stored in the energy storage element after the transmitter circuit transmits the wireless signal satisfies an intermediate threshold sufficient to enable transmission of sensor data by the transmitter; and causing the transmitter to transmit sensor data from at least one of the plurality of sensors in response to determining that the energy stored in the energy storage element satisfies the intermediate threshold.

15. The system of claim 9, wherein the receiver processor is configured with processor executable instructions to perform operations further comprising determining whether the quantity is changing based on whether the determined intervals between receptions of wireless signals from the transmitter are changing.

16. The system of claim 9, further comprising a server, wherein the receiver processor is configured with processor executable instructions to perform operations further comprising:

storing as sensor data at least one of the determined intervals between receptions of wireless signals and the calculated measures of the quantity;

connecting to the server; and transferring the stored sensor data to the server.

* * * * *